(12) United States Patent
Tsuruoka

(10) Patent No.: US 8,184,924 B2
(45) Date of Patent: May 22, 2012

(54) IMAGE PROCESSING APPARATUS AND IMAGE PROCESSING PROGRAM

(75) Inventor: Takao Tsuruoka, Machida (JP)

(73) Assignee: Olympus Corporation, Tokyo (JP)

( * ) Notice: Subject to any disclaimer, the term of this patent is extended or adjusted under 35 U.S.C. 154(b) by 1218 days.

(21) Appl. No.: 11/978,315

(22) Filed: Oct. 29, 2007

(65) Prior Publication Data

US 2008/0085062 A1  Apr. 10, 2008

Related U.S. Application Data

(63) Continuation of application No. PCT/JP2006/308345, filed on Apr. 20, 2006.

(30) Foreign Application Priority Data

May 13, 2005  (JP) .................................. 2005-141538

(51) Int. Cl.
| | |
|---|---|
| G06K 9/00 | (2006.01) |
| G06K 9/34 | (2006.01) |
| G06K 9/40 | (2006.01) |
| G06K 9/46 | (2006.01) |
| G06K 9/66 | (2006.01) |
| G06K 9/20 | (2006.01) |
| G06K 9/36 | (2006.01) |
| G06K 1/00 | (2006.01) |
| H04N 5/225 | (2006.01) |
| H04N 9/04 | (2006.01) |
| H04N 5/228 | (2006.01) |
| H04N 5/202 | (2006.01) |
| G06F 15/00 | (2006.01) |
| G03F 3/08 | (2006.01) |

(52) U.S. Cl. ........ 382/274; 382/162; 382/168; 382/173; 382/190; 382/254; 382/282; 348/207.99; 348/222.1; 348/254; 358/1.9; 358/521

(58) Field of Classification Search .................. 382/100, 382/128, 130–132, 162, 167, 168–169, 254–255, 382/260–262, 264–265, 274–276; 348/207.99, 348/207.1, 222.1, 254; 358/1.1, 1.2, 1.9, 358/2.1, 3.01, 518, 521–522

See application file for complete search history.

(56) References Cited

U.S. PATENT DOCUMENTS 5,164,993 A * 11/1992 Capozzi et al. ............... 382/132
(Continued)

FOREIGN PATENT DOCUMENTS

JP          59-84968 U     6/1984
(Continued)

OTHER PUBLICATIONS

R.C. Puetter, T.R. Gosnell, and Amos Yahil, Digital Image Reconstruction: Deblurring and Denoising, Annual Review of Astronomy and Astrophysics, vol. 43: 139-194 (Volume publication date Sep. 2005).*

(Continued)

*Primary Examiner* — Anand Bhatnagar
*Assistant Examiner* — Nathan Bloom
(74) *Attorney, Agent, or Firm* — Holtz, Holtz, Goodman & Chick, PC

(57) ABSTRACT

An image processing apparatus including: an information amount calculation unit which reduces an image signal obtained by a CCD, and which performs a plurality of tone conversion processes of different characteristics on the reduced image signal to calculate an information amount of the image signal and an information amount of noise; a setting unit which formulizes the relationship of the information amount of the image signal and the information amount of the noise with respect to a tone conversion characteristic on the basis of the information amounts calculated by the information amount calculation unit, and which sets a tone conversion curve maximizing an effective information amount as a tone conversion curve used in the tone conversion processing; and a tone conversion unit which performs the tone conversion processing on the image signal on the basis of the tone conversion curve set by the setting unit.

25 Claims, 25 Drawing Sheets

U.S. PATENT DOCUMENTS

| | | | |
|---|---|---|---|
| 5,633,511 A * | 5/1997 | Lee et al. | 250/587 |
| 6,717,698 B1 * | 4/2004 | Lee | 358/1.9 |
| 6,804,408 B1 * | 10/2004 | Gallagher et al. | 382/272 |
| 6,813,389 B1 * | 11/2004 | Gindele et al. | 382/274 |
| 2002/0097908 A1 * | 7/2002 | Ohashi | 382/187 |
| 2003/0012414 A1 * | 1/2003 | Luo | 382/118 |
| 2003/0068085 A1 * | 4/2003 | Said | 382/170 |
| 2003/0215867 A1 * | 11/2003 | Gulati | 435/6 |
| 2004/0042656 A1 * | 3/2004 | Timor et al. | 382/171 |
| 2004/0234148 A1 * | 11/2004 | Yamada | 382/250 |
| 2006/0269158 A1 * | 11/2006 | O'Hara et al. | 382/254 |

FOREIGN PATENT DOCUMENTS

| | | |
|---|---|---|
| JP | 10-210323 A | 8/1998 |
| JP | 2000-354179 A | 12/2000 |
| JP | 3465226 B2 | 4/2001 |
| JP | 2003-69821 A | 3/2003 |
| JP | 3424060 B2 | 5/2003 |
| JP | 2004-72422 A | 3/2004 |
| JP | 2004-128985 A | 4/2004 |
| JP | 2004-271565 A | 9/2004 |
| WO | WO 2004/023787 A2 | 3/2004 |

OTHER PUBLICATIONS

Japanese Office Action dated Mar. 3, 2009 (3 pages), and English translation thereof (3 pages), issued in counterpart Japanese Application Serial No. 2005-141538.

Supplementary Extended European Search Report dated Aug. 17, 2009 (8 pages), issued in counterpart European Application Serial No. 06745526.1.

Gastaud, J.-L. et al., "Entropy estimation from noise modeling applied to signal restoration", International Conference on Information, Communications and Signal Processing, ICICS Sep. 9-12, 1997, vol. 1, New York, NY, pp. 113-117.

* cited by examiner

FIG.2

| R$_{00}$ | G$_{10}$ | R$_{20}$ | G$_{30}$ | R$_{40}$ | G$_{50}$ |
|---|---|---|---|---|---|
| G$_{01}$ | B$_{11}$ | G$_{21}$ | B$_{31}$ | G$_{41}$ | B$_{51}$ |
| R$_{02}$ | G$_{12}$ | R$_{22}$ | G$_{32}$ | R$_{42}$ | G$_{52}$ |
| G$_{03}$ | B$_{13}$ | G$_{23}$ | B$_{33}$ | G$_{43}$ | B$_{53}$ |
| R$_{04}$ | G$_{14}$ | R$_{24}$ | G$_{34}$ | R$_{44}$ | G$_{54}$ |
| G$_{05}$ | B$_{15}$ | G$_{25}$ | B$_{35}$ | G$_{45}$ | B$_{55}$ |

FIG.3

| Cy$_{00}$ | Ye$_{10}$ | Cy$_{20}$ | Ye$_{30}$ | Cy$_{40}$ | Ye$_{50}$ |
|---|---|---|---|---|---|
| G$_{01}$ | Mg$_{11}$ | G$_{21}$ | Mg$_{31}$ | G$_{41}$ | Mg$_{51}$ |
| Cy$_{02}$ | Ye$_{12}$ | Cy$_{22}$ | Ye$_{32}$ | Cy$_{42}$ | Ye$_{52}$ |
| Mg$_{03}$ | G$_{13}$ | Mg$_{23}$ | G$_{33}$ | Mg$_{43}$ | G$_{53}$ |
| Cy$_{04}$ | Ye$_{14}$ | Cy$_{24}$ | Ye$_{34}$ | Cy$_{44}$ | Ye$_{54}$ |
| G$_{05}$ | Mg$_{15}$ | G$_{25}$ | Mg$_{35}$ | G$_{45}$ | Mg$_{55}$ |

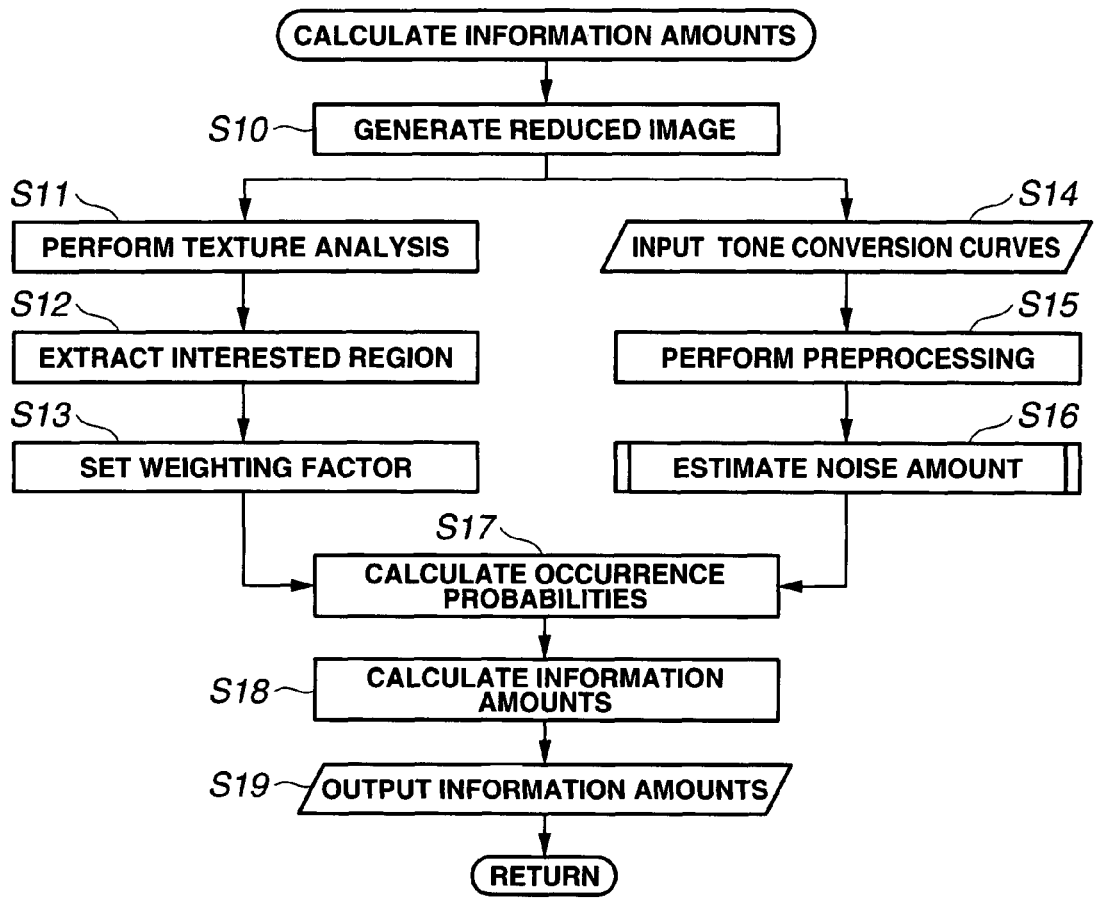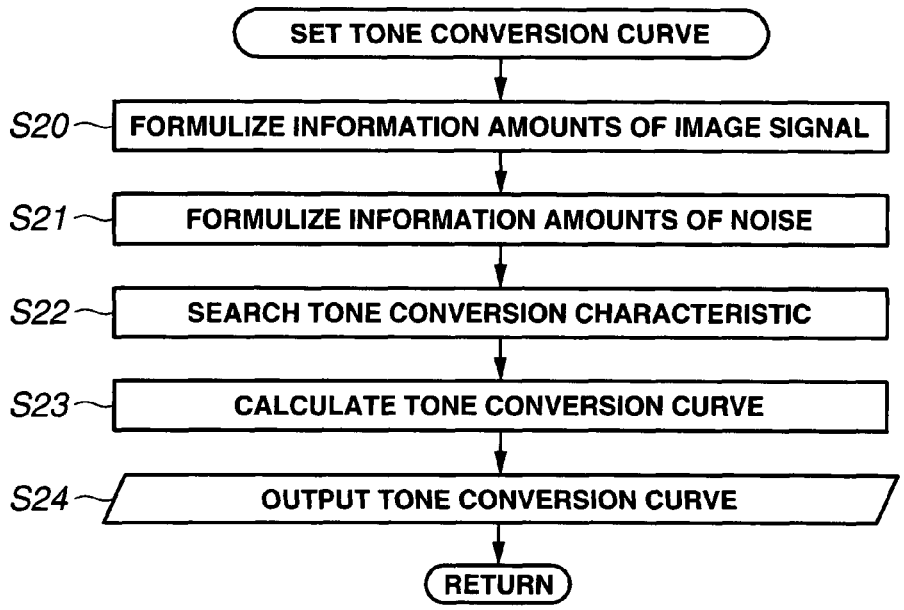

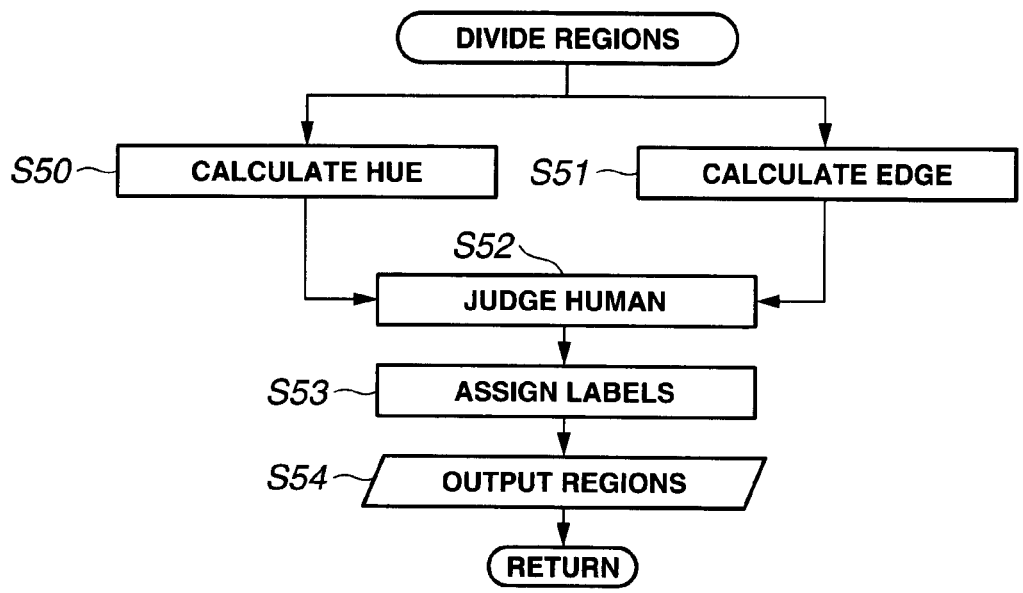
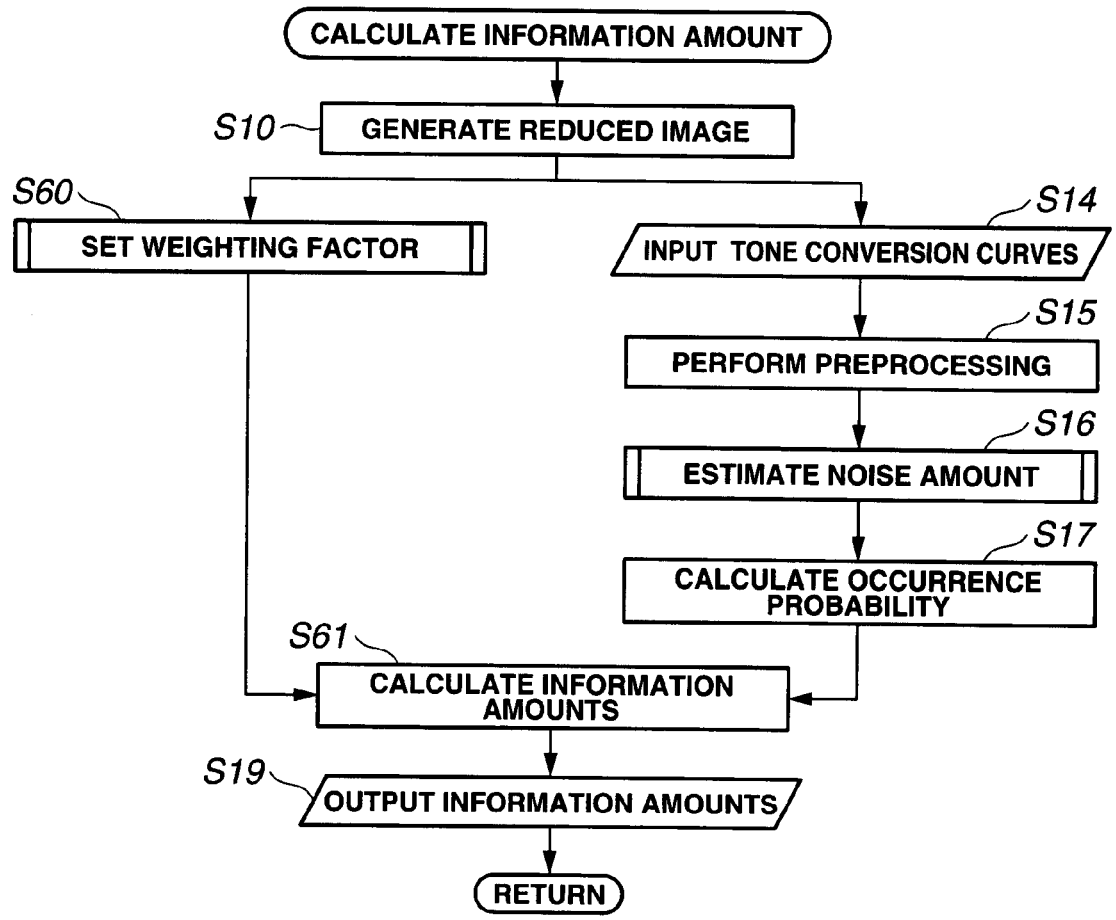

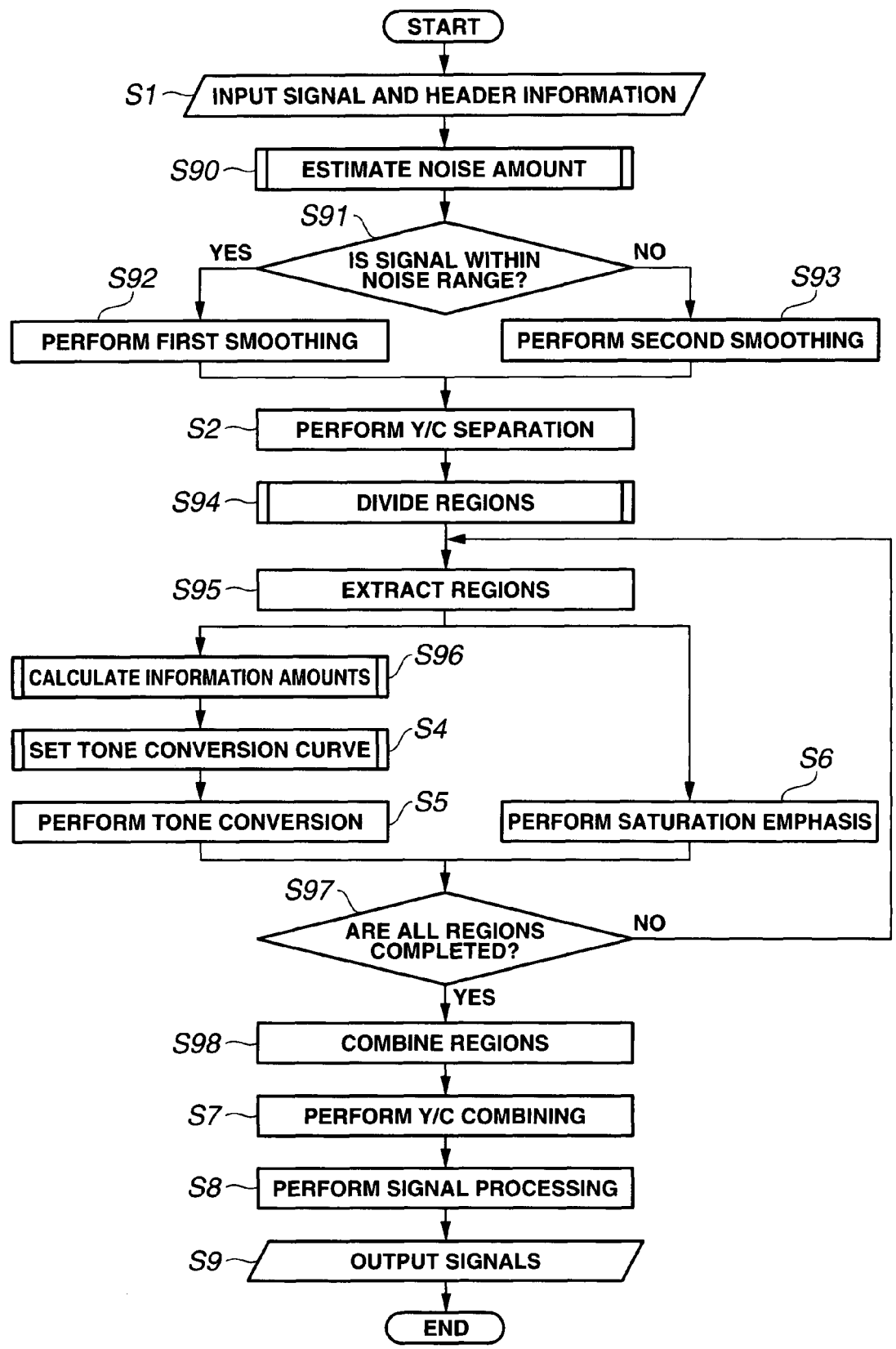

IMAGE PROCESSING APPARATUS AND IMAGE PROCESSING PROGRAM

CROSS REFERENCE TO RELATED APPLICATION

This application is a continuation application of PCT/JP2006/308345 filed on Apr. 20, 2006 and claims benefit of Japanese Application No. 2005-141538 filed in Japan on May 13, 2005, the entire contents of which are incorporated herein by this reference.

BACKGROUND OF THE INVENTION

1. Field of the Invention

The present invention relates to an image processing apparatus and an image processing program for adaptively performing tone conversion processing on an image signal, and particularly to an image processing apparatus and an image processing program capable of performing optimal tone conversion processing in consideration of the influence of a noise component.

2. Description of the Related Art

In current image pickup apparatuses, such as a digital still camera and a video camera, to prevent deterioration of image quality due to underflow in digital signal processing, it is common to set the tone range of a signal in an input system and a processing system (approximately 10 to 12 bits) to be greater than the tone range of a final output signal (usually 8 bits).

In such a configuration, the tone conversion processing with general emphasis processing needs to be performed to adjust the tone range of a signal to the tone range of an output system.

In the above, the tone conversion of an image signal has been performed in conventional tone conversion processing with the use of a fixed tone conversion curve for a standard scene.

Meanwhile, techniques of adaptively performing the tone conversion processing have been proposed. Such techniques include, for example, a technique of calculating the tone conversion curve for each image signal on the basis of a histogram and performing the tone conversion on the basis of the calculated tone conversion curve.

Further, Japanese Patent No. 3424060 describes a technique of dividing an image signal into a predetermined number of regions, calculating the tone conversion curve for each of the divided regions on the basis of a histogram, performing the tone conversion processing on the basis of the calculated tone conversion curve, and thereafter combining the respective regions subjected to the conversion.

Further, Japanese Patent No. 3465226 describes a technique of dividing an image signal into a plurality of regions on the basis of texture information, calculating the tone conversion curve for each of the divided regions on the basis of a histogram, and performing the tone conversion processing on the basis of the calculated tone conversion curve.

Furthermore, Japanese Unexamined Patent Application Publication No. 2003-69821 describes a technique of performing the tone conversion processing in consideration of a main subject by estimating a shooting situation. The publication further describes a technique of suppressing a side effect, such as noise, by imposing a predetermined restriction on the obtained tone conversion curve.

As the technique of reducing the noise, a variety of other proposals have been made. For example, Japanese Unexamined Patent Application Publication No. 2004-72422 describes a technique of performing high quality noise reduction processing by dynamically estimating the amount of the noise.

However, the conventional fixed tone conversion curve as described above involves a problem in that a suitable image signal cannot be obtained in a nonstandard situation, such as in backlight scene.

Further, in the techniques described in the foregoing Japanese Patent Nos. 3424060 and 3465226, the tone conversion curve is calculated for each image signal on the basis of the histogram. Thus, the increase of a noise component is not taken into consideration. Therefore, there is a problem in that optimal tone conversion processing is not always performed for image quality.

Furthermore, in, the technique described in Japanese Unexamined Patent Application Publication No. 2003-69821, the tone conversion processing is performed under the predetermined restriction. Thus, there is a problem in that, while a deterioration by noise does not occur in a normal image signal, a sufficient noise suppression effect cannot be obtained in an image signal of a wide dynamic range, for example. In addition, the technique described in the publication involves another problem in that constant performance of optimal tone conversion processing is not guaranteed, and thus that insufficient image quality may be obtained.

Further, in the technique described in Japanese Unexamined Patent Application Publication No. 2004-72422, the noise reduction process and the tone conversion process are independent of each other. Thus, there is a problem in that optimal mutual use of the processes is prevented.

The present invention has been made in view of the above circumferences. An object of the present invention is to provide an image processing apparatus and an image processing program capable of obtaining a high quality image signal by performing the optimal tone conversion in consideration of the change of the noise component.

Further, another object of the present invention is to provide an image processing apparatus and an image processing program capable of obtaining a high quality image signal by performing the optimal tone conversion in consideration of both the change of the noise component caused by the noise reduction process and the change of the noise component caused by the tone conversion process.

SUMMARY OF THE INVENTION

To achieve the above-described objects, the present invention is an image processing apparatus, for performing tone conversion processing on an image signal obtained from an image pickup system, including: information amount calculation means for calculating an information amount of the image signal and an information amount of noise from the image signal, setting means for setting a tone conversion curve used in the tone conversion processing on the basis of the information amount of the image signal and the information amount of the noise, and tone conversion means for performing the tone conversion processing on the image signal on the basis of the tone conversion curve.

Further, the present invention is an image processing program, for causing a computer to perform tone conversion processing on an image signal obtained from an image pickup system, including: an information amount calculation step of calculating an information amount of the image signal and an information amount of noise from the image signal, a setting step of setting a tone conversion curve used in the tone conversion processing on the basis of the information amount of the image signal and the information amount of the noise, and a tone conversion step of performing the tone conversion processing on the image signal on the basis of the tone conversion curve.

BRIEF DESCRIPTION OF THE DRAWINGS

FIG. 2 is a diagram illustrating a configuration of a Bayer-type primary color filter in the Embodiment 1.

FIG. 3 is a diagram illustrating a configuration of a color-difference line-sequential type complementary color filter in the Embodiment 1.

FIG. 13 is a flow chart illustrating the processing of calculating the information amount in the image processing program of the Embodiment 1.

FIG. 14 is a flow chart illustrating the processing of setting the tone conversion curve in the image processing program of the Embodiment 1.

FIG. 22 is a flow chart illustrating the processing of dividing into regions in the image processing program of the Embodiment 2.

FIG. 23 is a flow chart illustrating the processing of calculating the information amount in the image processing program of the Embodiment 2.

FIG. 30 is a flow chart illustrating the entirety of the processing by an image processing program of the Embodiment 4.

DETAILED DESCRIPTION OF THE PREFERRED EMBODIMENT(S)

Embodiments of the present invention will be described below with reference to the drawings.

Embodiment 1

Figure 1:
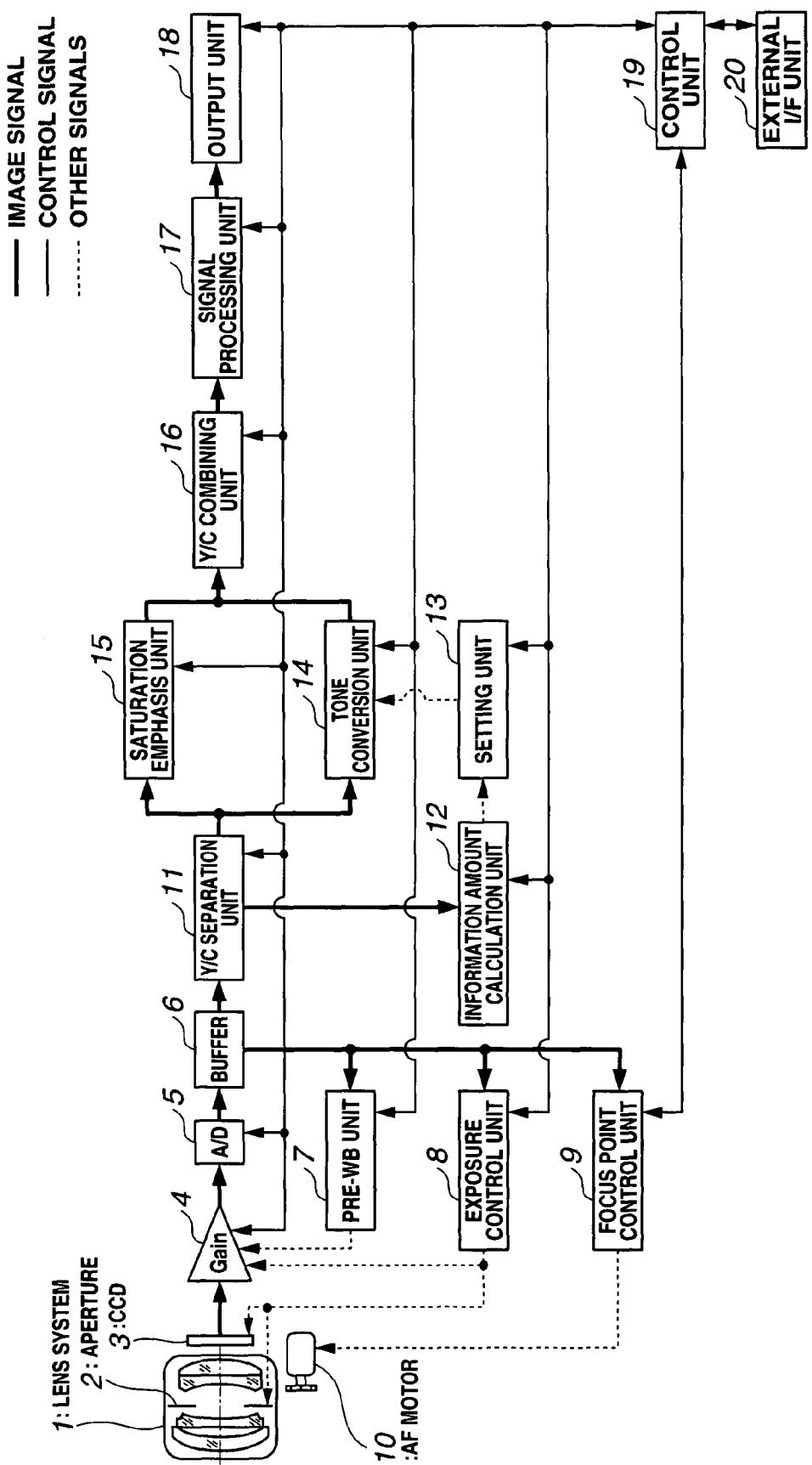
FIG. 1 is a block diagram illustrating a configuration of an image pickup apparatus in Embodiment 1 of the present invention.
Figure 4:
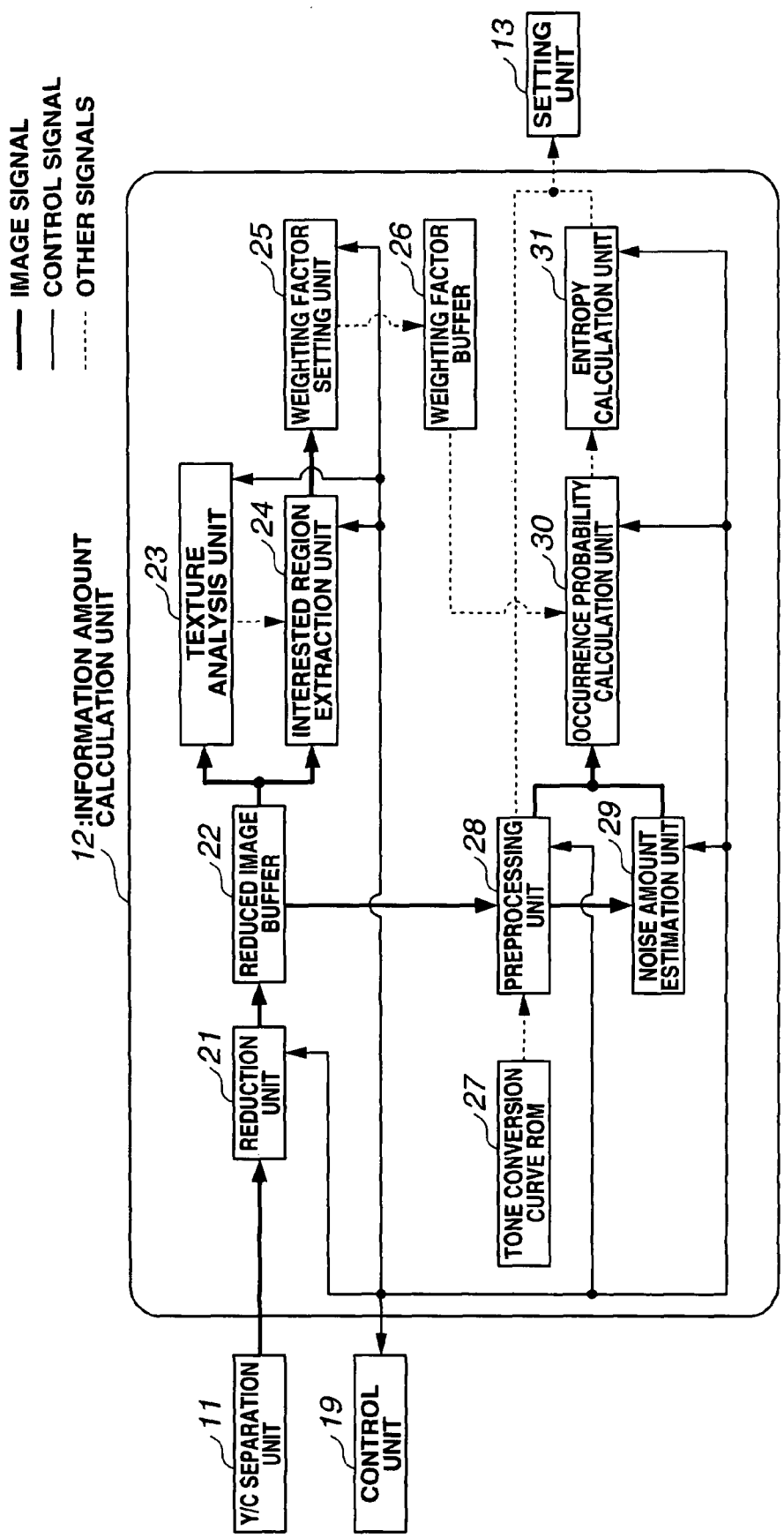
FIG. 4 is a block diagram illustrating a configuration of an information amount calculation unit in the Embodiment 1.
Figure 5:
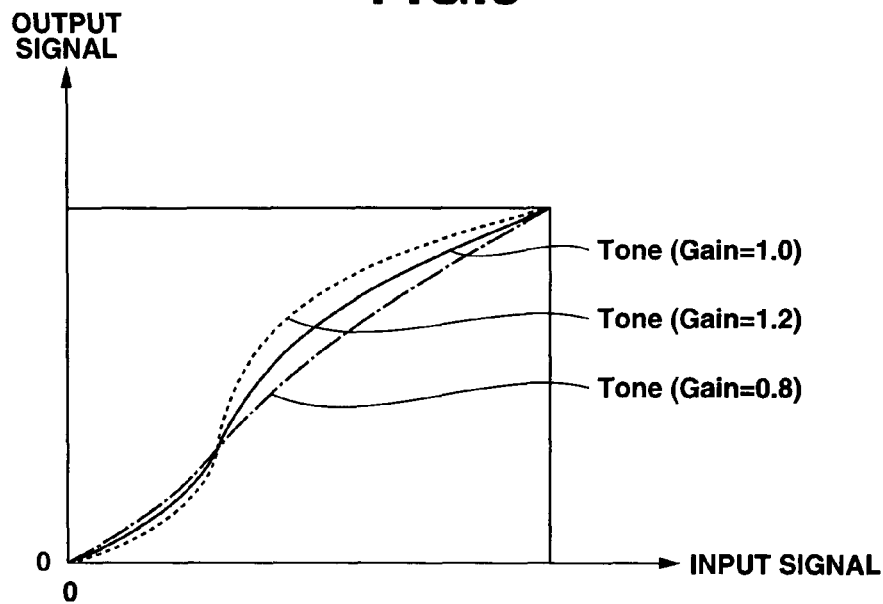
FIG. 5 is a diagram illustrating tone conversion curves in the Embodiment 1.
Figure 6:
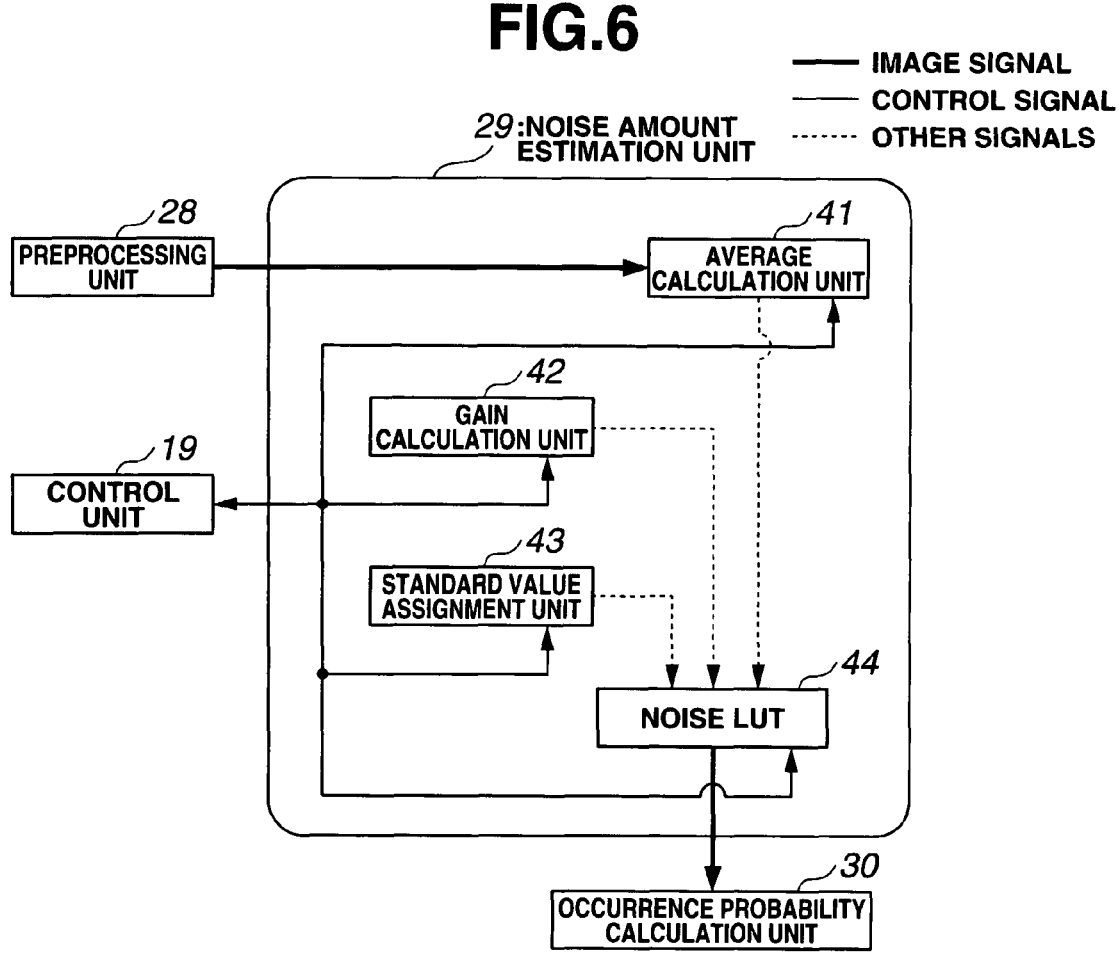
FIG. 6 is a block diagram illustrating a configuration of a noise amount estimation unit in the Embodiment 1.
Figure 7:
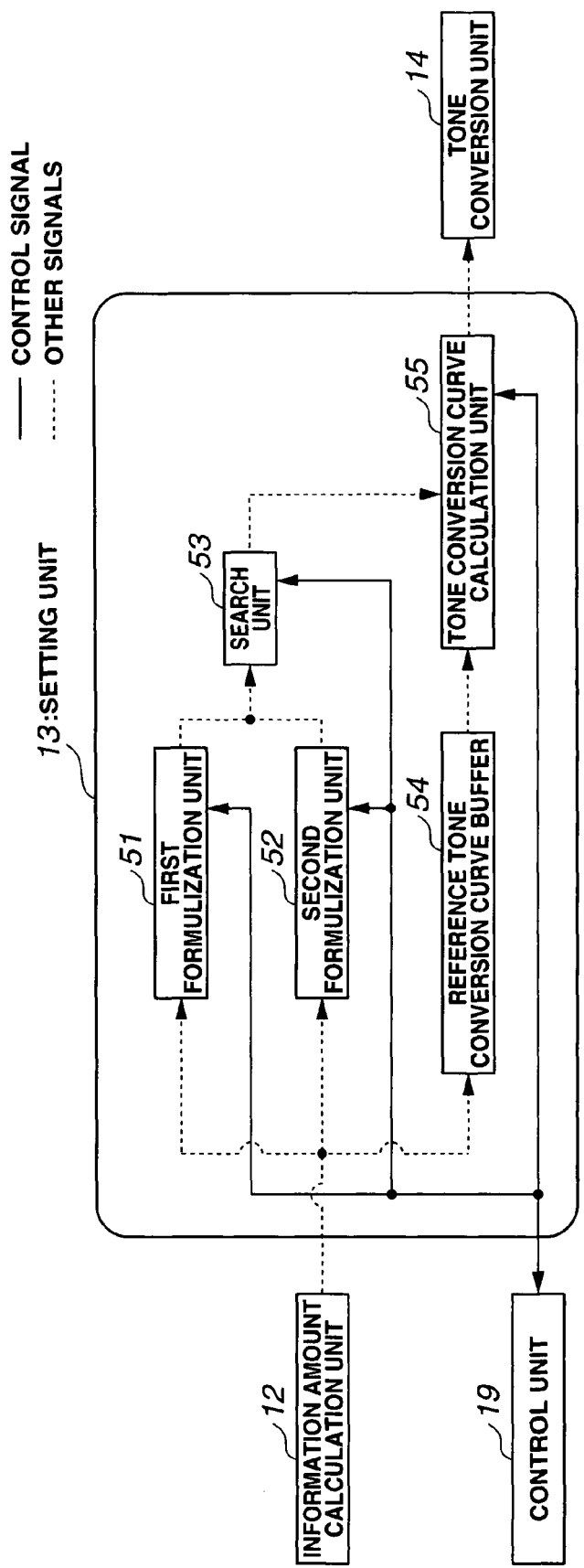
FIG. 7 is a block diagram illustrating a configuration of a setting unit in the Embodiment 1.
Figure 8:
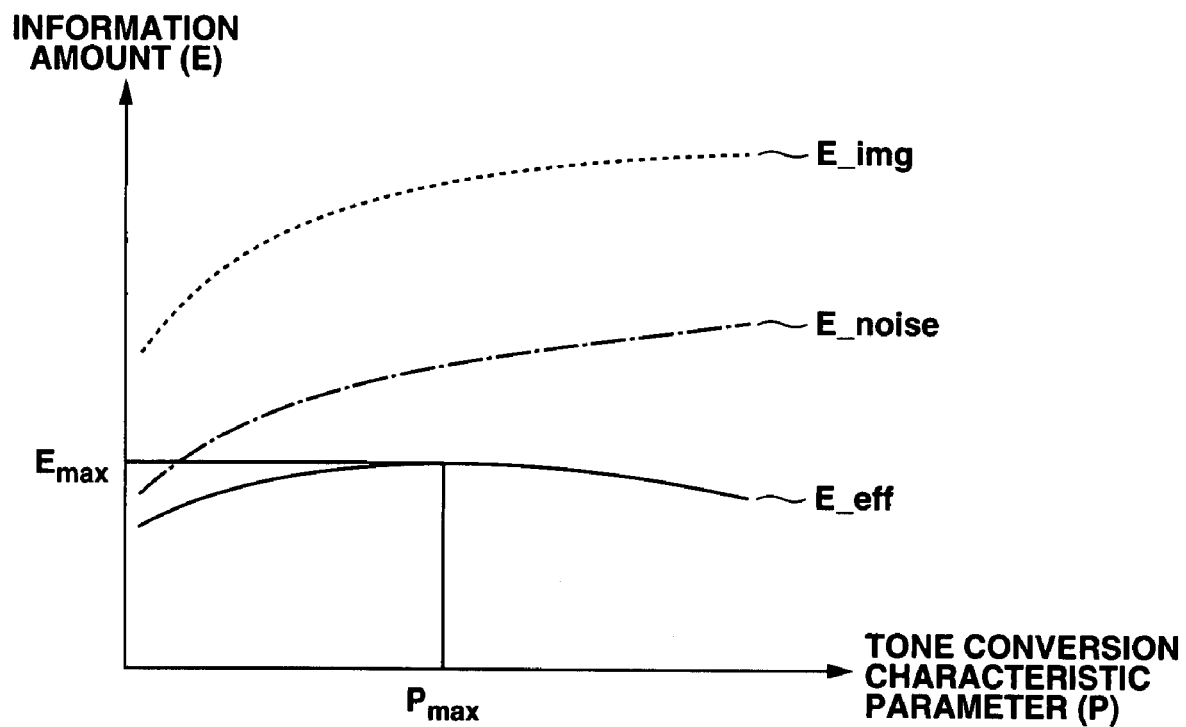
FIG. 8 is a diagram illustrating the relationship between a tone conversion characteristic parameter and an information amount in a search for a tone conversion curve maximizing the information amount in the Embodiment 1.
Figure 9:
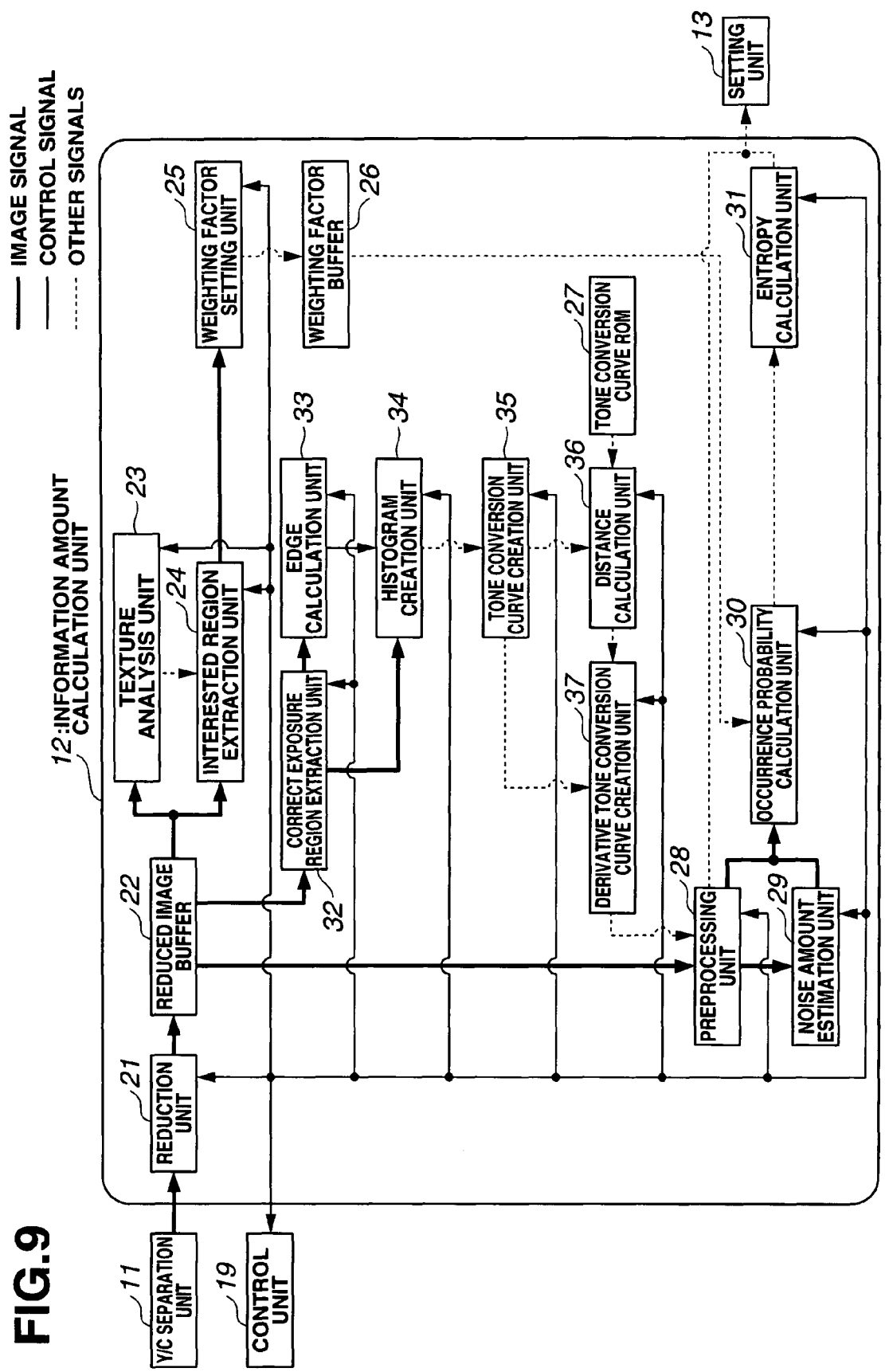
FIG. 9 is a block diagram illustrating another configuration example of the information amount calculation unit in the Embodiment 1.
Figure 10:
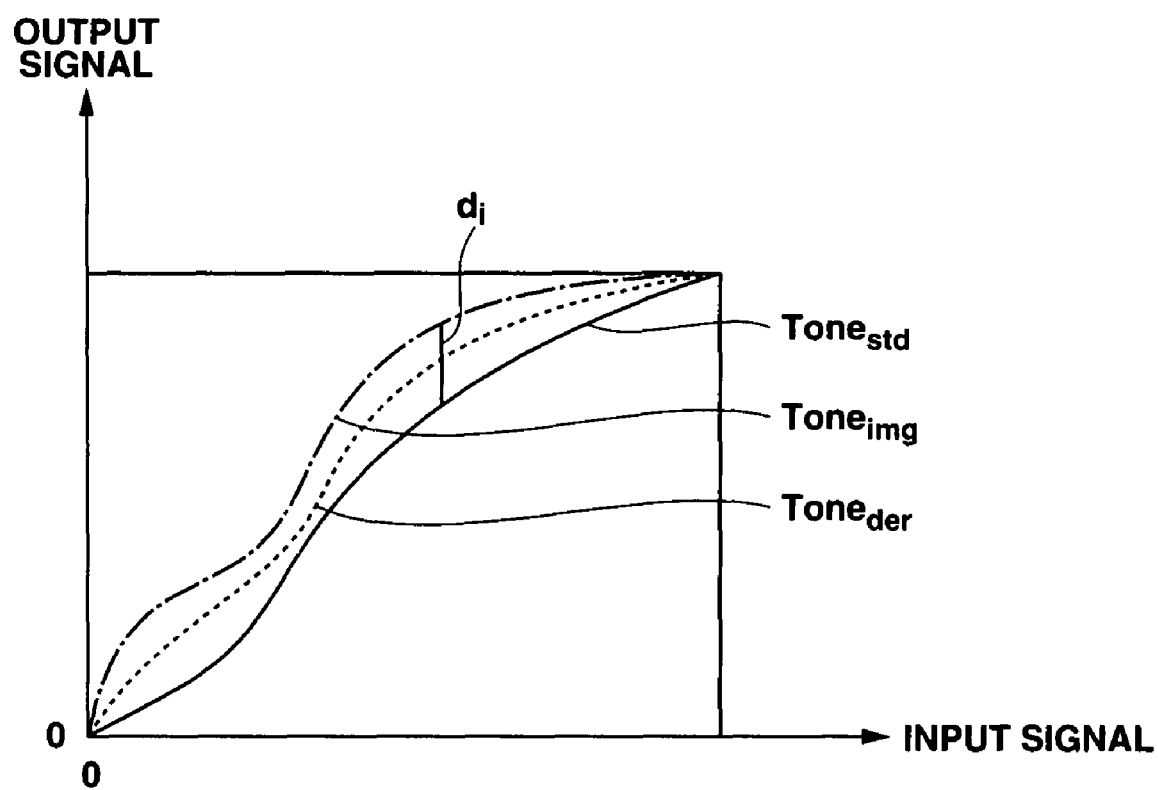
FIG. 10 is a diagram illustrating tone conversion curves in the configuration example illustrated in FIG. 9.
Figure 11:
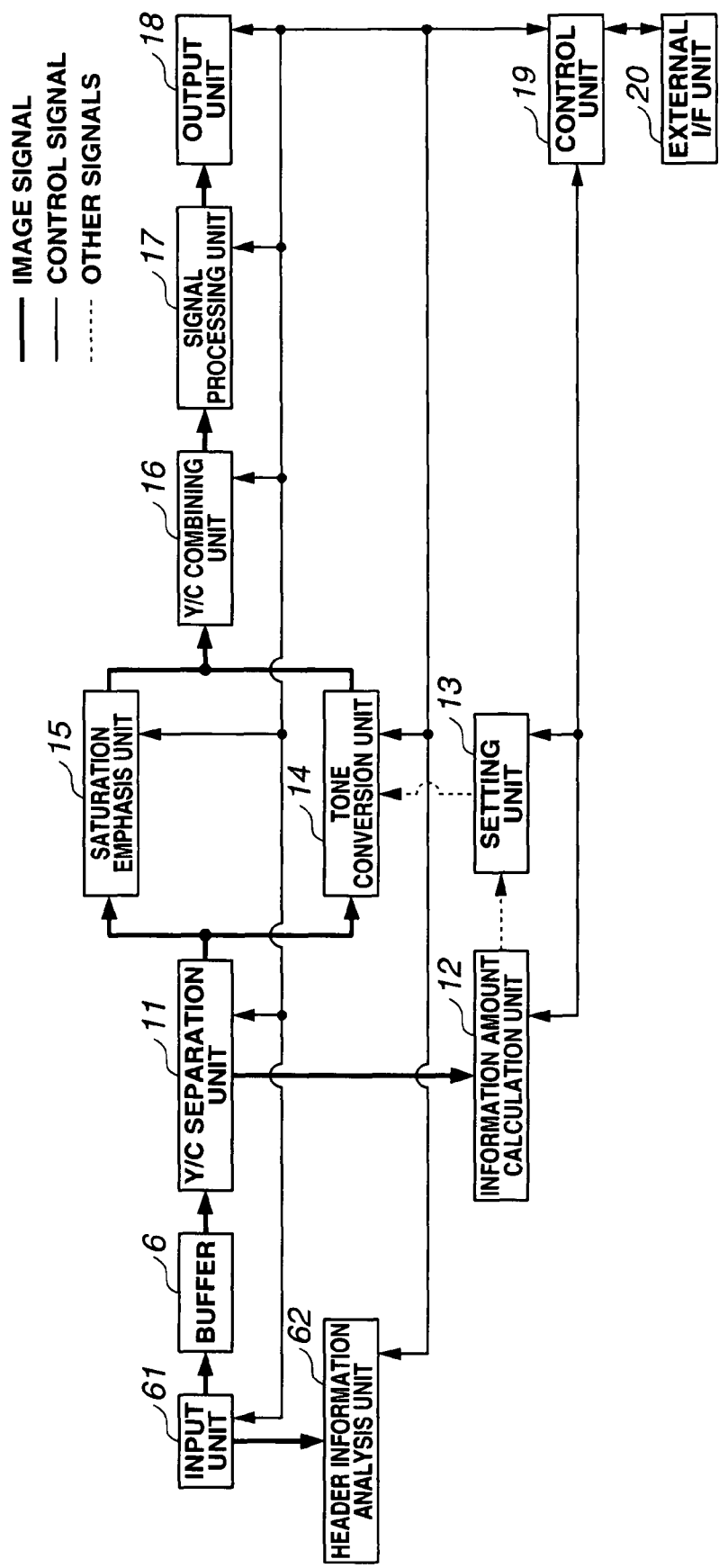
FIG. 11 is a block diagram illustrating another configuration example of the image processing apparatus in the Embodiment 1.
Figure 12:
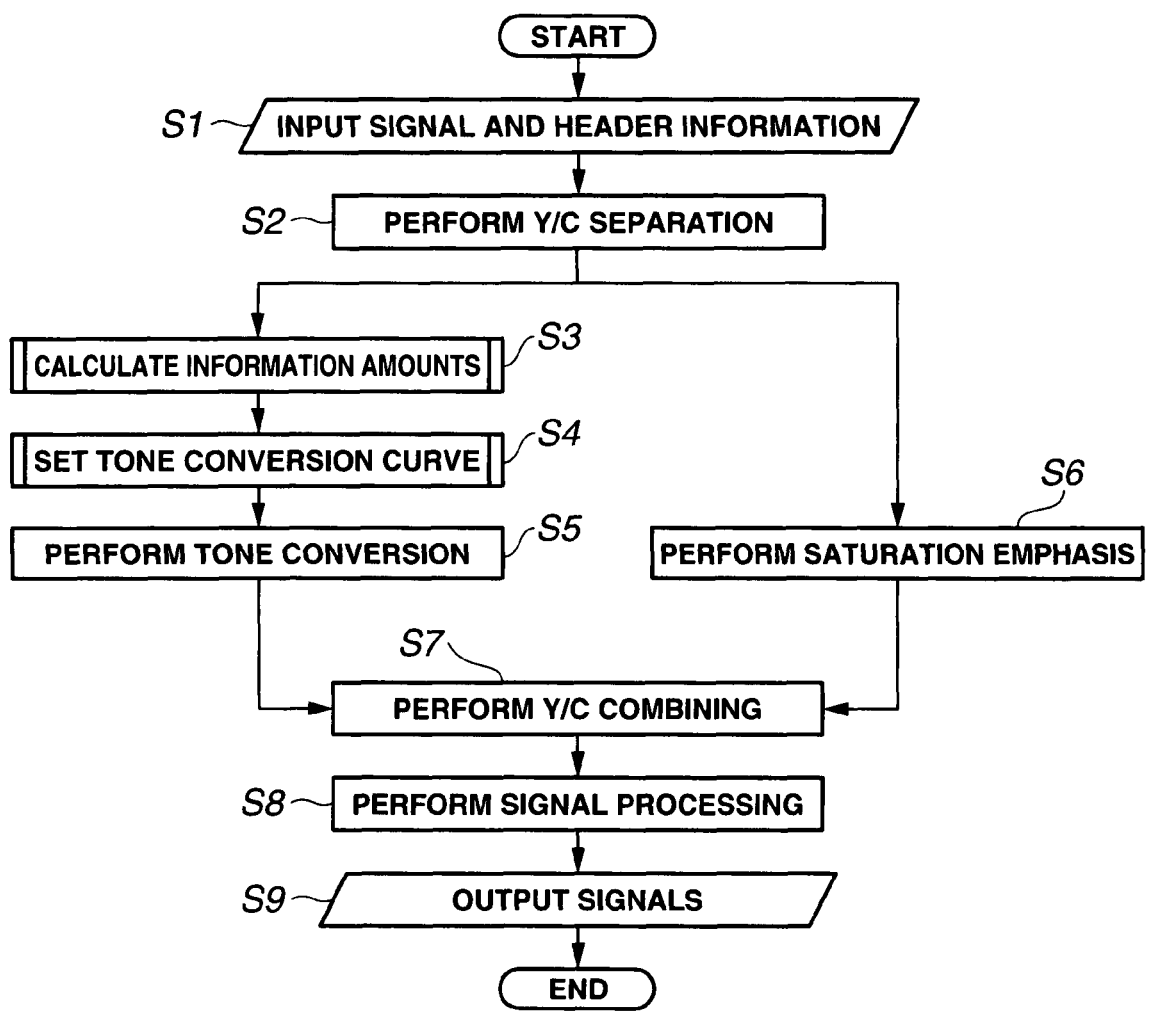
FIG. 12 is a flow chart illustrating the entirety of the processing by an image processing program of the Embodiment 1.
Figure 15:
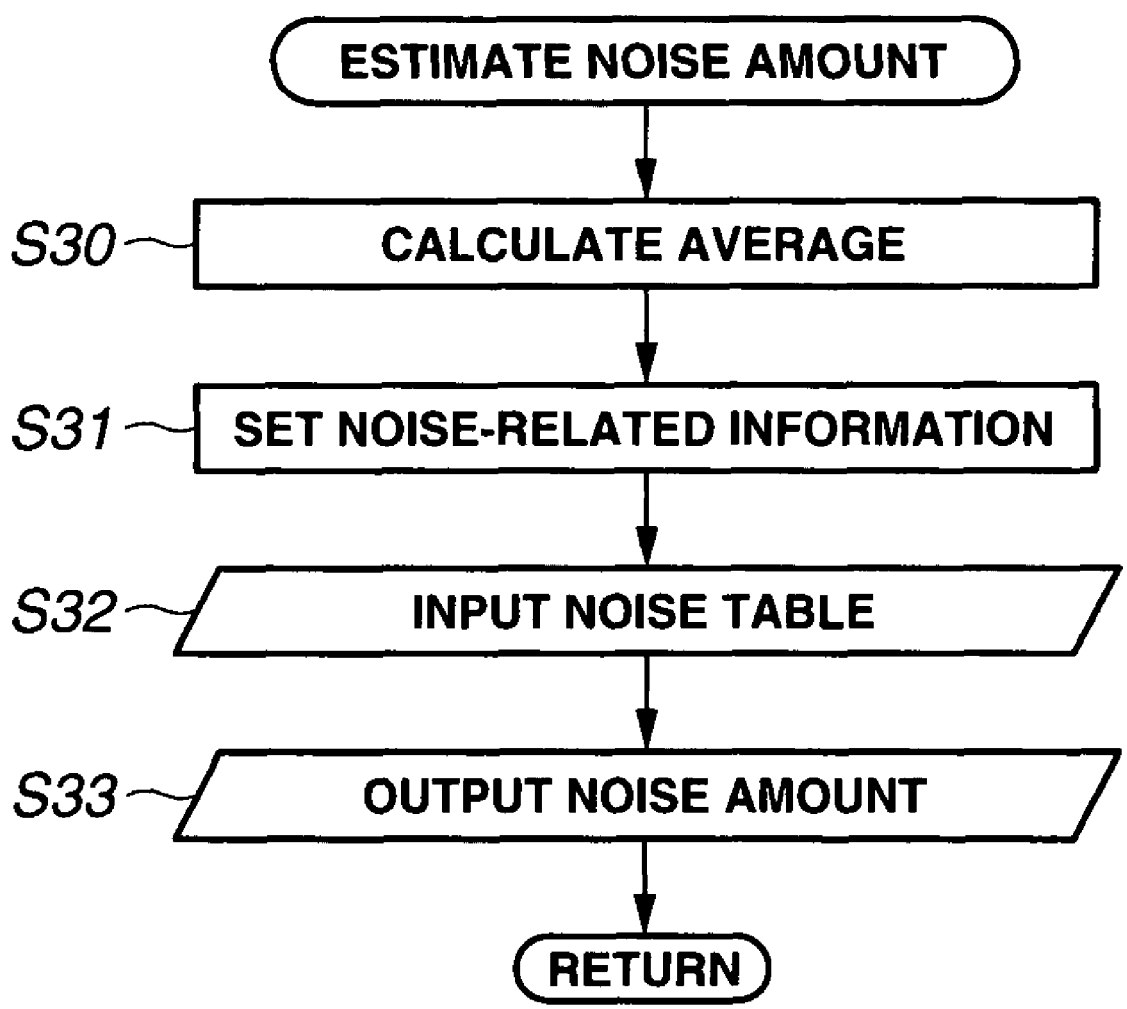
FIG. 15 is a flow chart illustrating the processing of estimating the amount of noise in the image processing program of the Embodiment 1.

FIGS. 1 to 15 illustrate Embodiment 1 of the present invention. FIG. 1 is a block diagram illustrating a configuration of an image pickup apparatus. FIG. 2 is a diagram illustrating a configuration of a Bayer-type primary color filter. FIG. 3 is a diagram illustrating a configuration of a color-difference line-sequential type complementary color filter. FIG. 4 is a block diagram illustrating a configuration of an information amount calculation unit. FIG. 5 is a diagram illustrating tone conversion curves. FIG. 6 is a block diagram illustrating a configuration of a noise amount estimation unit. FIG. 7 is a block diagram illustrating a configuration of a setting unit. FIG. 8 is a diagram illustrating the relationship between a tone conversion characteristic parameter and an information amount in a search for a tone conversion curve maximizing the information amount. FIG. 9 is a block diagram illustrating another configuration example of the information amount calculation unit. FIG. 10 is a diagram illustrating tone conversion curves in the configuration example illustrated in FIG. 9. FIG. 11 is a block diagram illustrating another configuration example of the image processing apparatus. FIG. 12 is a flow chart illustrating the entirety of the processing by an image processing program. FIG. 13 is a flow chart illustrating the processing of calculating the information amount in the image processing program. FIG. 14 is a flow chart illustrating the processing of setting the tone conversion curve in the image processing program. FIG. 15 is a flow chart illustrating the processing of estimating the amount of noise in the image processing program.

In the present embodiment, the image processing apparatus is applied to the image pickup apparatus.

As illustrated in FIG. 1, the present image pickup apparatus is configured to include a lens system 1, an aperture 2, a CCD 3, a Gain 4, an A/D conversion unit 5, a buffer 6, a Pre-WB unit 7, an exposure control unit 8, a focus control unit 9, an AF motor 10, a Y/C separation unit 11, an information amount calculation unit 12, a setting unit 13, a tone conversion unit 14, a saturation emphasis unit 15, a Y/C combining unit 16, a signal processing unit 17, an output unit 18, a control unit 19, and an external I/F unit 20.

The lens system 1 constitutes an image pickup optical system for forming an image of a subject.

The aperture 2 is arranged inside the lens system 1 to regulate the transmission range of the luminous flux in the lens system 1.

The CCD 3 performs photoelectric conversion on the optical image of the subject formed by the lens system 1 through the aperture 2, and outputs an electrical image signal. The CCD 3 constitutes an image pickup device formed by a single CCD or the like in front of which is arranged a Bayer-type primary color filter.

The Gain 4 amplifies the image signal outputted from the CCD 3.

The A/D conversion unit 5 converts the analog image signal amplified by the Gain 4 into a digital signal.

The buffer 6 temporarily stores the digital image signal outputted from the A/D conversion unit 5.

The Pre-WB unit 7 calculates a simple white balance coefficient by accumulating each color signal with a specified luminance level in the image signal stored in the buffer 6, and output the coefficient to the Gain 4.

The exposure control unit 8 determines the luminance level of the image signal stored in the buffer 6, and controls the aperture 2, the CCD 3, and the Gain 4 on the basis of the result of the luminance level.

The focus control unit 9 detects a focal point on the basis of the image signal stored in the buffer 6, and controls the AF motor 10 on the basis of the result of the detection.

The AF motor 10 is controlled by the focus control unit 9 to control a focus lens and so forth included in the lens system 1.

The Y/C separation unit 11 constitutes separation means for reading the image signal from the buffer 6 and separating the image signal into a luminance signal and color difference signals.

The information amount calculation unit 12 constitutes information amount calculation means for calculating, from the luminance signal separated by the Y/C separation unit 11, the information amounts of the image signal and the information amounts of noise with respect to a plurality of tone conversion curves.

The setting unit 13 constitutes setting means for searching a tone conversion characteristic maximizing an effective information amount on the basis of the information amounts of the image signal and the information amounts of the noise signal with respect to the plurality of tone conversion curves, and calculating a tone conversion curve corresponding to the searched tone conversion characteristic.

The tone conversion unit 14 constitutes tone conversion means for performing tone conversion processing on the luminance signal Y obtained from the Y/C separation unit 11 with the use of the tone conversion curve obtained from the setting unit 13.

The saturation emphasis unit 15 constitutes saturation emphasis means for performing saturation emphasis processing on the color difference signals Cb and Cr obtained from the Y/C separation unit 11 by multiplying the signals by a predetermined gain.

The Y/C combining unit 16 calculates RGB signals on the basis of the luminance signal Y obtained from the tone conversion unit 14 and the color difference signals Cb and Cr obtained from the saturation emphasis unit 15.

The signal processing unit 17 performs signal processing, such as a publicly known compression process, on the RGB signals obtained from the Y/C combining unit 16.

The output unit 18 records and saves the image signal processed by the signal processing unit 17 in a recording medium, such as a memory card, for example.

The control unit 19 such as a microcomputer and so forth, constitutes control means for controlling the entirety of the present image pickup apparatus. The control unit 19 is bidirectionally connected to the Gain 4, the A/D conversion unit 5, the Pre-WB unit 7, the exposure control unit 8, the focus control unit 9, the Y/C separation unit 11, the information amount calculation unit 12, the setting unit 13, the tone conversion unit 14, the saturation emphasis unit 15, the Y/C combining unit 16, the signal processing unit 17, the output unit 18, and the external I/F unit 20 to control the respective units.

The external I/F unit 20 includes interfaces to external devices, such as a power supply switch for turning on and off the power supply of the image pickup apparatus, a shutter button for inputting an instruction for performing an image pickup operation, and a mode switch button for switching among a variety of modes in an shooting operation.

Subsequently, description will be made of the flow of signals in the image pickup apparatus as illustrated in FIG. 1.

After shooting conditions, such as the ISO sensitivity, have been set via the external I/F unit 20, the image pickup apparatus is entered a pre-image pickup mode by half pressing a shutter button formed by a two stage press button switch.

An image signal picked up by the CCD 3 through the lens system 1 and the aperture 2 is outputted as an analog signal.

As described above, the present embodiment is assumed to include a single image pickup device (a single CCD) in front of which is arranged the Bayer-type primary color filter. The Bayer-type primary color filter is configured as illustrated in FIG. 2. In the Bayer-type, 2×2 pixels constitute a basic unit, in which green (G) filters are arranged for two pixels in one diagonal direction, while red (R) and blue (B) filters are arranged for two pixels in the other diagonal direction.

The image pickup device, however, does not need to be limited to the configuration including the Bayer-type primary color filter. For example, it is possible to apply a single image pickup device in front of which is arranged a color-difference line-sequential type complementary color filter as illustrated in FIG. 3. The color-difference line-sequential type complementary color filter is configured, for example, such that cyan (Cy) and yellow (Ye) filters and green (G) and magenta (Mg) filters are alternately arranged on the odd lines and the even lines, respectively, and the positions of G and Mg are exchanged in each line. Further, the image pickup device is not limited to the above-described configurations. Thus, a two image pickup device or a three image pickup device can be used.

Further, the analog image signal outputted from the CCD 3 is converted into a digital image signal by the A/D conversion unit 5. Assume that in the present embodiment, the A/D conversion unit 5 performs conversion into the digital image signal in 12 bits (0 to 4095) scale, for example.

The digital image signal outputted from the A/D conversion unit 5 is stored in the buffer 6, and thereafter is transmitted to the Pre-WB unit 7, the exposure control unit 8, and the focus control unit 9, respectively.

The Pre-WB unit 7 calculates the simple white balance coefficient by accumulating each color signal with a specified luminance level. The simple white balance coefficient calculated by the Pre-WB unit 7 is transmitted to the Gain 4. On the basis of the simple white balance coefficient, the Gain 4 sets a different gain for each color signal to perform simple white balance processing.

In consideration of the set ISO sensitivity, a limit shutter speed allowing image stability unaffected by hand shaking, and so forth, the exposure control unit 8 calculates the luminance level of the image signal and controls the aperture value of the aperture 2, the electric shutter speed of the CCD 3, the amplification factor of the Gain 4, and so forth so as to obtain correct exposure.

Further, the focus control unit 9 detects the edge intensity of the image signal and controls the AF motor 10 so as to maximize the edge intensity, to thereby obtain a focused image.

When the preparation for a real shooting operation has been completed after the above-described pre-image pickup mode operation, and upon detection of the full-pressing of the shutter button via the external I/F unit 20, the control unit 19 performs a control of the real shooting operation.

When the operation of the real shooting starts, the real shooting operation is performed on the basis of the simple white balance coefficient calculated by the Pre-WB unit 7, the exposure condition obtained by the exposure control unit 8, and the focusing condition obtained by the focus control unit 9. Further, the above conditions for the shooting operation are also transmitted to the control unit 19.

The image signal outputted from the CCD 3 is thus transmitted to the buffer 6, and is further transmitted to the Y/C separation unit 11.

On the basis of the control by the control unit 19, the Y/C separation unit 11 performs a publicly known interpolation process on each of the RGB signals to convert the signal into three signals. Thereafter, the Y/C separation unit 11 calculates the luminance signal Y and the color difference signals Cb and Cr, as indicated in the following Formula 1.

$$Y=0.29900R+0.58700G+0.11400B$$

$$Cb=-0.16874R-0.33126G+0.50000B$$

$$Cr=0.50000R-0.41869G-0.08131B \quad \text{Formula 1}$$

The luminance signal Y is transmitted to the information amount calculation unit 12 and the tone conversion unit 14, while the color difference signals Cb and Cr are transmitted to the saturation emphasis unit 15.

On the basis of the control by the control unit 19, the information amount calculation unit 12 calculates from the luminance signal Y the information amounts of the image signal E_img and the information amounts of the noise signal E_noise with respect to a plurality of tone conversion curves. The calculated information amounts of the image signal E_img and information amounts of the noise signal E_noise and tone conversion characteristics characterizing the plurality of tone conversion curves are transmitted to the setting unit 13.

On the basis of the control by the control unit 19, and from the information amounts of the image signal E_img, the information amounts of the noise signal E_noise, and the tone conversion characteristics transmitted from the information amount calculation unit 12, the setting unit 13 searches a tone conversion characteristic maximizing an effective information amount, and calculates a tone conversion curve corresponding to the searched tone conversion characteristic. The calculated tone conversion curve is transmitted to the tone conversion unit 14.

On the basis of the control by the control unit 19, and with the use of the tone conversion curve transmitted from the setting unit 13, the tone conversion unit 14 performs the tone conversion processing on the luminance signal Y transmitted from the Y/C separation unit 11. The above-described operations of the information amount calculation unit 12, the setting unit 13, and the tone conversion unit 14 are sequentially performed on the basis of the control by the control unit 19.

Further, on the basis of the control by the control unit 19, the saturation emphasis unit 15 performs the saturation emphasis processing on the color difference signals Cb and Cr transmitted from the Y/C separation unit 11 by multiplying the signals by a predetermined gain.

The luminance signal Y transmitted from the tone conversion unit 14 and the color difference signals Cb and Cr transmitted from the saturation emphasis unit 15 are transmitted to the Y/C combining unit 16, and the RGB signals are calculated, as indicated in the following Formula 2.

$$R=Y+1.40200Cr$$

$$G=Y-0.34414Cb-0.71414Cr$$

$$B=Y+1.77200Cb \quad \text{Formula 2}$$

The above-described operations of the tone conversion unit 14, the saturation emphasis unit 15, and the Y/C combining unit 16 are performed in synchronization with one another on the basis of the control by the control unit 19.

The RGB signals obtained from the Y/C combining unit 16 are transmitted to the signal processing unit 17. The signal processing unit 17 performs, for example, a publicly known compression process on the transmitted RGB signals, and transmits the result of the process to the output unit 18.

On the basis of the control by the control unit 19, the output unit 18 records and saves the image signal transmitted from the signal processing unit 17 in the recording medium, such as a memory card.

Subsequently, with reference to FIG. 4, description will be made of an example of the configuration of the information amount calculation unit 12.

The present information amount calculation unit 12 is configured to include a reduction unit 21, a reduced image buffer 22, a texture analysis unit 23, an interested region extraction unit 24, a weighting factor setting unit 25, a weighting factor buffer 26, a tone conversion curve ROM 27, a preprocessing unit 28, a noise amount estimation unit 29, an occurrence probability calculation unit 30, and an entropy calculation unit 31.

Further, the control unit 19 is bidirectionally connected to the reduction unit 21, the texture analysis unit 23, the interested region extraction unit 24, the weighting factor setting unit 25, the preprocessing unit 28, the noise amount estimation unit 29, the occurrence probability calculation unit 30, and the entropy calculation unit 31 to control the respective units.

On the basis of the control by the control unit 19, the reduction unit 21 constituting reduction means reads from the Y/C separation unit the luminance signal Y expressed in the Formula 1, reduces the signal at a predetermined reduction ratio, and transmits the signal to the reduced image buffer 22. The reduction ratio of the reduction unit 21 can be arbitrarily set in consideration of the processing speed and the image quality. Further, to place top priority on the image quality, it is possible to omit the reduction process and transmit the original signal directly to the reduced image buffer 22.

On the basis of the control by the control unit 19, the texture analysis unit 23 reads the reduced luminance signal Y from the reduced image buffer 22 to perform texture analysis of the signal. The texture analysis unit 23 constitutes interested region extraction means and feature value calculation means. The texture analysis unit 23 is configured to employ a publicly known texture analysis, such as the analysis described in the foregoing Japanese Patent No. 3465226, for example.

The interested region extraction unit 24 constituting interested region extraction means reads the reduced luminance signal Y from the reduced image buffer 22, and reads the result of the texture analysis from the texture analysis unit 23. Then, on the basis of the result of the texture analysis, the interested region extraction unit 24 separates the signal by determining a region including a texture structure as an interested region and a region not including a texture structure as a background region, and transmits both regions to the weighting factor setting unit 25.

On the basis of the control by the control unit 19, the weighting factor setting unit 25 constituting weighting factor setting means reads the interested region and the background region from the interested region extraction unit 24. Then, the weighting factor setting unit 25 sets 2.0, for example, as the weighting factor for the interested region and 1.0, for example, as the weighting factor for the background region, and transmits the weighting factors to the weighting factor buffer 26.

Meanwhile, on the basis of the control by the control unit 19, the preprocessing unit 28 constituting preprocessing means reads the reduced luminance signal Y from the reduced image buffer 22, and reads three types of tone conversion curves from the tone conversion curve ROM 27.

FIG. 5 herein shows an example of the three types of tone conversion curves recorded in the tone conversion curve ROM 27 constituting preprocessing means and recording means. Tone (Gain=1.0) of FIG. 5 represent a reference tone conversion curve, a derivative tone conversion curve Tone (Gain=1.2) generated by multiplying the rate of change of Tone (Gain=1.0) by a multiplier coefficient Gain=1.2, and a derivative tone conversion curve Tone (Gain=0.8) generated by multiplying the rate of change of Tone (Gain=1.0) by a multiplier coefficient Gain=0.8, respectively.

The multiplier coefficient Gain herein constitutes of tone conversion characteristics characterizing the tone conversion curve. As described above, the reference tone conversion curve has Gain=1.0. Further, the multiplier coefficient Gain constituting the tone conversion characteristics is also recorded in the tone conversion curve ROM 27.

With the use of the three types of tone conversion curves as described above, the preprocessing unit 28 performs the tone conversion processing on the reduced luminance signal Y read from the reduced image buffer 22, and transmits the result of the processing to the noise amount estimation unit 29 and the occurrence probability calculation unit 30. Further, the preprocessing unit 28 transmits the reference tone conversion curve read from the tone conversion curve ROM 27 to the setting unit 13.

On the basis of the control by the control unit 19, the noise amount estimation unit 29 constituting noise estimation means sequentially reads from the preprocessing unit 28 the reduced luminance signals Y subjected to the tone conversion processing by the three types of tone conversion curves, estimates corresponding amounts of noise, and generates noise signals. The process of generating the noise signals will be later described with reference to FIG. 6.

On the basis of the control by the control unit 19, the occurrence probability calculation unit 30 constituting weighting factor correction means reads three types of reduced luminance signals Y from the preprocessing unit 28, reads three types of noise signals from the noise amount estimation unit 29, and calculates occurrence probabilities Pro(i). Herein, "i" represents a pixel value (i=0 to 4095, since 12 bits are assumed in the present embodiment). More specifically speaking of the occurrence probabilities Pro(i), Pro_img$_j$(i) and Pro_noise$_j$(i) are calculated from the three types of reduced luminance signals Y and the three types of noise signals, respectively. As a result, a total of six types of occurrence probabilities are calculated. Meanwhile, "j" takes the value of j=0 to 2, and represents the types of the above-described signals (the reduced luminance signal and the noise signal), (i.e., the types corresponding to one reference tone conversion curve and two derivative tone conversion curves as shown in FIG. 5). Further, the occurrence probability calculation unit 30 reads the weighting factors from the weighting factor buffer 26, and adjusts the occurrence probabilities in accordance with the read weighting factors. As described above, it is assumed in the present embodiment that the weighting factor 2.0 is set for the interested region. Thus, the occurrence probabilities are calculated on the assumption that the interested region includes 2.0 times of the pixel value. The six types of occurrence probabilities Pro_img$_j$(i) and Pro_noise$_j$(i) thus calculated by the occurrence probability calculation unit 30 are transmitted to the entropy calculation unit 31.

The entropy calculation unit 31 constitutes first calculation means, second calculation means, and weighting factor correction means. On the basis of the control by the control unit 19, the entropy calculation unit 31 reads from the occurrence probability calculation unit 30 the six types of occurrence probabilities Pro_img$_j$(i) and Pro_noise$_j$(i), and calculates entropies E_img$_j$ representing the information amounts of the image signals and entropies E_noise$_j$ representing the information amounts of the noise signals, respectively, as indicated in the following Formula 3.

$$E\_img_j = \sum_i Pro\_img_j(i) \cdot \log_2 \frac{1}{Pro\_img_j(i)} \qquad \text{Formula 3}$$

$$E\_noise_j = \sum_i Pro\_noise_j(i) \cdot \log_2 \frac{1}{Pro\_noise_j(i)}$$

The information amounts of the image signals E_img$_j$ and the information amounts of the noise signals E_noise$_j$ thus calculated by the entropy calculation unit 31 are transmitted to the setting unit 13.

Subsequently, with reference to FIG. 6, description will be made of an example of the configuration of the noise amount estimation unit 29.

The noise amount estimation unit 29 is configured to include an average calculation unit 41, a gain calculation unit 42, a standard value assignment unit 43, and a noise LUT 44.

Further, the control unit 19 is bidirectionally connected to the average calculation unit 41, the gain calculation unit 42, the standard value assignment unit 43, and the noise LUT 44 to control the respective units.

On the basis of the control by the control unit 19, the average calculation unit 41 constituting average calculation means reads the three types of reduced luminance signals Y from the preprocessing unit 28, and sequentially extracts local regions each having a predetermined size including a target pixel, e.g., 3×3-pixel unit local regions. Herein, the local region is set for each target pixel, and the target pixel is scanned for each pixel. Thus, the local regions are extracted while overlapping. Then, the average calculation unit 41 calculates the average value for each of the extracted local regions, and transmits the calculated average value to the noise LUT 44.

On the basis of the information relating to the exposure condition and the white balance coefficient transmitted from the control unit 19, the gain calculation unit 42 constituting collection means calculates the amount of amplification in the Gain 4, and transmits the calculated amount of amplification to the noise LUT 44.

Further, the standard value assignment unit 43 constituting standard value assignment means transmits a predetermined temperature value to the noise LUT 44 as the operation temperature of the CCD 3.

The noise LUT 44 constituting noise amount calculation means forms a lookup table recording therein the relationship among the signal value level of the image signal transmitted from the average calculation unit 41, the amount of amplification of the image signal transmitted from the gain calculation unit 42, the operation temperature of the CCD 3 transmitted from the standard value assignment unit 43, and the amount of the noise. The lookup table is designed by a publicly known technique, such as the technique described in the foregoing Japanese Unexamined Patent Application Publication No. 2003-69821, for example. Then, on the basis of the control by the control unit 19, the noise LUT 44 sequentially outputs, for each pixel, the amounts of noise with respect to the target pixels transmitted from the average calculation unit 41, and transmits the amounts of noise to the occurrence probability calculation unit 30.

Subsequently, with reference to FIG. 7, description will be made of an example of the configuration of the setting unit 13.

The setting unit 13 is configured to include a first formulization unit 51, a second formulization unit 52, a search unit 53, a reference tone conversion curve buffer 54, and a tone conversion curve calculation unit 55.

Further, the control unit 19 is bidirectionally connected to the first formulization unit 51, the second formulization unit 52, the search unit 53, and the tone conversion curve calculation unit 55 to control the respective units.

The first formulization unit 51 constituting first formulization means reads from the information amount calculation unit 12 the information amounts of the image signals $E\_img_j$ with respect to the three types of tone conversion curves and the tone conversion characteristics characterizing the three types of tone conversion curves (Gain1=1.0, Gain2=1.2, and Gain3=0.8 in the present embodiment, as shown in FIG. 5). The curve E_img shown in FIG. 8 represents the relationship between the information amount of the image signal (E_img) and a tone conversion characteristic parameter (P), and is modeled by a second order function, for example, as indicated in the following Formula 4.

$$E\_img = a_1 P^2 + b_1 P + c_1 \qquad \text{Formula 4}$$

Herein, $a_1$, $b_1$, and $c_1$ of the Formula 4 are constant terms. Further, the parameter P representing the tone conversion characteristic is the multiplier coefficient Gain in the present embodiment. Therefore, if the information amounts of the three types of image signals $E\_img_j$ and the multiplier coefficients Gain1, Gain2, and Gain3 representing the tone conversion characteristics are substituted in the Formula 4, three independent linear expressions including three unknowns $a_1$, $b_1$, and $c_1$ are obtained. Then, if the linear expressions are simultaneously solved, the constant terms $a_1$, $b_1$, and $c_1$ of the Formula 4 can be uniquely calculated. The constant terms $a_1$, $b_1$, and $c_1$ thus calculated by the first formulization unit 51 are transmitted to the search unit 53.

Similarly, the second formulization unit 52 constituting second formulization means reads from the information amount calculation unit 12 the information amounts of the noise signals $E\_noise_j$ with respect to the three types of tone conversion curves and the multiplier coefficients Gain1, Gain2, and Gain3 representing the tone conversion characteristics characterizing the three types of tone conversion curves. The curve E_noise shown in FIG. 8 represents the relationship between the information amount of the noise (E_noise) and the tone conversion characteristic parameter (P), and is modeled similarly as described above by a second order function, for example, as indicated in the following Formula 5.

$$E\_noise = a_2 P^2 + b_2 P + c_2 \qquad \text{Formula 5}$$

Herein, $a_2$, $b_2$, and $c_2$ of the Formula 5 are constant terms. Further, as described above, the parameter P representing the tone conversion characteristic is the multiplier coefficient Gain in the present embodiment. Therefore, if the information amounts of the three types of noise signals $E\_noise_j$ and the multiplier coefficients Gain1, Gain2, and Gain3 representing the tone conversion characteristics are substituted in the Formula 5, three independent linear expressions including three unknowns $a_2$, $b_2$, and $c_2$ are obtained. Then, if the linear expressions are simultaneously solved, the constant terms $a_2$, $b_2$, and $c_2$ of the Formula 5 can be uniquely calculated. The constant terms $a_2$, $b_2$, and $c_2$ thus calculated by the second formulization unit 52 are transmitted to the search unit 53.

The search unit 53 constituting search means defines the information amount obtained by subtracting the information amount of the noise signal E_noise from the information amount of the image signal E_img as an effective information amount E_eff, and calculates a tone conversion characteristic maximizing the effective information amount E_eff. The curve E_eff shown in FIG. 8 represents the relationship between the effective information amount (E_eff) and the tone conversion characteristic parameter (P). The information amount of the image signal E_img is modeled by a second order function, as indicated in the Formula 4, and the information amount of the noise signal E_noise is modeled by a second order function, as indicated in the Formula 5. Thus, the effective information amount E_eff is also modeled by a second order function, as indicated in the following Formula 6.

$$E\_eff = E\_img - E\_noise = (a_1-a_2)P^2 + (b_1-b_2)P + (c_1-c_2) \qquad \text{Formula 6}$$

A tone conversion characteristic parameter ($P_{max}$) maximizing the Formula 6 is provided to satisfy a conditional expression indicated in the following Formula 7, in which a value zero is obtained by partially differentiating the effective information amount E_eff by the tone conversion characteristic parameter P.

$$\frac{\partial E\_eff}{\partial P} = 2(a_1 - a_2)P + (b_1 - b_2) \to 0 \qquad \text{Formula 7}$$

Therefore, the $P_{max}$ is expressed as in the following Formula 8.

$$P_{max} = \frac{b_2 - b_1}{2(a_1 - a_2)} \qquad \text{Formula 8}$$

On the basis of the constant terms $a_1$, $b_1$, and $c_1$ transmitted from the first formulization unit 51 and the constant terms $a_2$, $b_2$, and $c_2$ transmitted from the second formulization unit 52, the search unit 53 calculates from the Formula 8 the tone conversion characteristic parameter ($P_{max}$) maximizing the effective information amount, and transmits the calculated parameter to the tone conversion curve calculation unit 55.

Meanwhile, the reference tone conversion curve buffer 54 records therein the reference tone conversion curve transmitted from the information amount calculation unit 12. As described above, the curve Tone (Gain=1.0) shown in FIG. 5 constitutes the reference tone conversion curve in the present embodiment.

The tone conversion curve calculation unit 55 constituting output means reads from the search unit 53 the tone conversion characteristic parameter ($P_{max}$) maximizing the effective information amount (in the present embodiment, the tone conversion characteristic parameter is a value corresponding to the multiplier coefficient Gain, as described above), and reads the reference tone conversion curve Tone (Gain1=1.0) from the reference tone conversion curve buffer 54. Then, the tone conversion curve calculation unit 55 multiplies the reference tone conversion curve by the multiplier coefficient Gain corresponding to the $P_{max}$ to calculate the tone conversion curve maximizing the effective information amount, and transmits the calculated tone conversion curve to the tone conversion unit 14.

In the above description, the embodiment is configured such that the tone conversion curves, the associated parameters, and so forth required to calculate the information amounts are previously recorded in the ROM. However, the embodiment does not need to be limited to the above configuration. For example, the embodiment may be configured such that the tone conversion curve is adaptively calculated for each image signal. Such an example will be described with reference to FIG. 9.

FIG. 9 illustrates another configuration example of the information amount calculation unit 12.

The information amount calculation unit 12 illustrated in FIG. 9 is configured such that the information amount calculation unit 12 illustrated in FIG. 4 is added with an correct exposure region extraction unit 32, an edge calculation unit 33, a histogram creation unit 34, a tone conversion curve creation unit 35, a distance calculation unit 36, and a derivative tone conversion curve creation unit 37. The present example is similar in basic configurations to the example illustrated in FIG. 4. Thus, the same configurations will be assigned with the same names and reference numerals, and description thereof will be omitted. Only different parts will be mainly described.

The reduced image buffer 22 is connected to the texture analysis unit 23, the interested region extraction unit 24, the preprocessing unit 28, and the correct exposure region extraction unit 32. The correct exposure region extraction unit 32 is connected to the edge calculation unit 33 and the histogram creation unit 34, and the edge calculation unit 33 is connected to the histogram creation unit 34. The histogram creation unit 34 is connected to the tone conversion curve creation unit 35, and the tone conversion curve creation unit 35 is connected to the distance calculation unit 36 and the derivative tone conversion curve creation unit 37. The tone conversion curve ROM 27 is connected to the distance calculation unit 36, the distance calculation unit 36 to the derivative tone conversion curve creation unit 37, and the derivative tone conversion curve creation unit 37 to the preprocessing unit 28.

The control unit 19 is bidirectionally connected to the correct exposure region extraction unit 32, the edge calculation unit 33, the histogram creation unit 34, the tone conversion curve creation unit 35, the distance calculation unit 36, and the derivative tone conversion curve creation unit 37 to control the respective units.

On the basis of the control by the control unit 19, the correct exposure region extraction unit 32 constituting preprocessing means and correct region extraction means reads the reduced luminance signal Y from the reduced image buffer 22, and compares the signal with a predetermined threshold value to extract only a correct exposure region. The luminance signal of the correct exposure region extracted by the correct exposure region extraction unit 32 is transmitted to the edge calculation unit 33 and the histogram creation unit 34, respectively.

On the basis of the control by the control unit 19, the edge calculation unit 33 constituting preprocessing means and edge calculation means extracts an edge signal from the luminance signal of the correct exposure region outputted from the correct exposure region extraction unit 32, and transmits the extracted edge signal to the histogram creation unit 34.

On the basis of the control by the control unit 19, the histogram creation unit 34 constituting preprocessing means and histogram creation means creates a histogram, from the luminance signal of the correct exposure region outputted from the correct exposure region extraction unit 32, for a pixel in which the edge signal transmitted from the edge calculation unit 33 is equal to or higher than a predetermined threshold value, and transmits the created histogram to the tone conversion curve creation unit 35.

On the basis of the control by the control unit 19, the tone conversion curve creation unit 35 constituting preprocessing means and tone conversion curve calculation means accumulates and normalizes the histograms transmitted from the histogram creation unit 34 to generate a tone conversion curve with respect to the image signal. Then, the tone conversion curve creation unit 35 transmits the generated tone conversion curve to the distance calculation unit 36 and the derivative tone conversion curve creation unit 37, respectively.

On the basis of the control by the control unit 19, the distance calculation unit 36 constituting preprocessing means and distance calculation means reads the reference tone conversion curve from the tone conversion curve ROM 27, and reads the tone conversion curve with respect to the image signal from the tone conversion curve creation unit 35. In FIG. 10, $Tone_{std}$ and $Tone_{img}$ represent the reference tone conversion curve and the tone conversion curve with respect to the image signal, respectively. The distance calculation unit 36 calculates a distance $d_i$ between the tone conversion curves (i=0 to 4095, since 12 bits are assumed in the present embodiment), as indicated in the following Formula 9.

$$d_i = Tone_{img} - Tone_{std} \qquad \text{Formula 9}$$

Then, the distance calculation unit 36 transmits the distance $d_i$ as indicated in the Formula 9 and the reference tone conversion curve $Tone_{std}$ to the derivative tone conversion curve creation unit 37.

On the basis of the control by the control unit 19, the derivative tone conversion curve creation unit 37 constituting preprocessing means and generation means reads the tone conversion curve $Tone_{img}$ with respect to the image signal from the tone conversion curve creation unit 35, and reads the distance $d_i$ from the distance calculation unit 36. Thereafter, on the basis of the read tone conversion curve $Tone_{img}$ and distance $d_i$, the derivative tone conversion curve creation unit 37 generates a derivative tone conversion curve $Tone_{der}$, as indicated in the following Formula 10.

$$Tone_{der} = Tone_{img} + k d_i \qquad \text{Formula 10}$$

Herein, k of the Formula 10 is a constant term. If the constant term k of the Formula 10 is adjusted, various types of derivative tone conversion curves can be generated.

The $Tone_{der}$ of FIG. 10 shows an example of the derivative tone conversion curve. In the example shown in FIG. 10, the derivative tone conversion curve $Tone_{der}$ constitutes an intermediate curve between the tone conversion curve $Tone_{img}$ and the reference tone conversion curve $Tone_{std}$.

The derivative tone conversion curve creation unit 37 transmits the reference tone conversion curve $Tone_{std}$, the tone conversion curve $Tone_{img}$ with respect to the image signal, and the derivative tone conversion curve $Tone_{der}$ to the preprocessing unit 28. In the configuration as described above, a total sum of the distances $k\Sigma d_i$ corresponds to the tone conversion characteristic characterizing the tone conversion curve.

Thereafter, the information amount is calculated in a similar manner as described in FIG. 4.

Further, as an example of the image processing apparatus, the above description presents the image pickup apparatus integrally configured with the image pickup unit including the lens system 1, the aperture 2, the CCD 3, the Gain 4, the A/D conversion unit 5, the Pre-WB unit 7, the exposure control unit 8, the focus control unit 9, and the AF motor 10. The image processing apparatus, however, does not need to be limited to the above configuration. For example, it is possible to record the image signal in an unprocessed Raw data state which is captured by a separate image pickup unit, in a recording medium such as a memory card, further record the associated information, such as the image pickup conditions, in the recording medium as a header portion or the like, and connect the recording medium to the image processing apparatus as illustrated in FIG. 11 to perform the processing through the image processing apparatus.

The image processing apparatus illustrated in FIG. 11 is configured such that the lens system 1, the aperture 2, the CCD 3, the Gain 4, the A/D conversion unit 5, the Pre-WB unit 7, the exposure control unit 8, the focus control unit 9, and the AF motor 10 are omitted from the configuration of the image pickup apparatus illustrated in FIG. 1, and that an input unit 61 and a header information analysis unit 62 are added. The present example is similar in other basic configurations to the example illustrated in FIG. 1. Thus, the same configurations will be assigned with the same names and reference numerals, and description thereof will be omitted. Only different parts will be mainly described.

The input unit 61, which is connected to the recording medium, such as a memory card, is connected to the buffer 6 and the header information analysis unit 62, respectively. Further, the control unit 19 is bidirectionally connected to the input unit 61 and the header information analysis unit 62 to control the respective units.

The operation of the above configuration is different from the operation of the configuration illustrated in FIG. 1 in the following point.

Starting reproduction operation through the external I/F unit 20 such as a mouse or a keyboard, allows the image signal and the header information saved in the recording medium such as a memory card, to be read in from the input unit 61 under the control by the control unit 19.

The image signal read by the input unit 61 is transmitted to the buffer 6. Further, the header information read by the input unit 61 is transmitted to the header information analysis unit 62.

The header information analysis unit 62 extracts information of the shooting operation from the header information, and transmits the extracted information to the control unit 19. The processes subsequent thereto are substantially similar to the processes described with reference to FIG. 1.

In addition, it is assumed in the above description that the processing is performed by hardware. However, the processing is not limited to the above. For example, the processing can be performed by software. That is, it is possible to record the image signal transmitted from the CCD 3 in the recording medium, such as a memory card, as unprocessed Raw data, record the associated information, such as the image pickup conditions transmitted from the control unit 19, in the recording medium as the header information, connect the recording medium to a computer, and execute an image processing program on the computer to perform the processing. Needless to say, the Raw data transmitted from the CCD 3 can be inputted to the computer directly or via a communication line, not through the recording medium.

With reference to FIG. 12, the processing by the image processing program will be described.

When the processing starts, the image signal and the header information including the gain and so forth are read in (Step S1).

Then, a publicly known interpolation process is performed, and the conversion as indicated in the Formula 1 for converting the image signal into the luminance signal Y and the color difference signals Cb and Cr is performed (Step S2).

Then, as described later with reference to FIG. 13, the information amounts of the image signal and the information amounts of noise with respect to a plurality of tone conversion curves are calculated with the use of the luminance signal Y (Step S3).

Subsequently, as described later with reference to FIG. 14, a tone conversion characteristic maximizing an effective information amount is set (Step S4).

Thereafter, on the basis of the set tone conversion characteristic, the tone conversion processing is performed on the luminance signal Y (Step S5).

Meanwhile, the saturation emphasis processing is performed on the color difference signals Cb and Cr (Step S6).

Then, with the use of the tone-converted luminance signal Y calculated at the Step S5 and the saturation-emphasized color difference signals Cb and Cr calculated at the Step S6, the RGB signals are calculated, as indicated in the Formula 2 (Step S7).

Further, the calculated RGB signals are subjected to signal processing, such as a publicly known compression process (Step S8).

Thereby, the processed signals are outputted (Step S9), and the present processing is completed.

Subsequently, with reference to FIG. 13, description will be made of the processing of calculating the information amounts at the foregoing Step S3.

When the present processing starts, the luminance signal Y is first reduced at a predetermined reduction ratio (Step S10).

Then, the texture analysis of the reduced luminance signal is performed (Step S11).

Thereafter, the signal is separated, with a region including a texture structure and a region not including a texture structure determined as an interested region and a background region, respectively (Step S12).

Then, individual weighting factors are set for the interested region and the background region (Step S13). It is assumed herein that weighting factors 2.0 and 1.0, for example, are set for the interested region and the background region, respectively.

Meanwhile, three types of tone conversion curves as shown in FIG. 5 are read (Step S14).

Subsequently, as preprocessing, the tone conversion processing is performed on the reduced luminance signal with the use of the three types of tone conversion curves (Step S15).

Then, as described later with reference to FIG. 15, the amount of the noise is estimated, and a noise signal is generated (Step S16).

Then, while performing adjustment on the basis of the weighting factors set at the Step S13, the occurrence probability is calculated for each pixel value of the reduced luminance signal, and the occurrence probability is calculated for each pixel value of the noise signal estimated at the Step S16 (Step S17).

Thereafter, on the basis of the entropies as indicated in the Formula 3, the information amounts of the image signal and the information amounts of the noise signal are calculated (Step S18).

Subsequently, the calculated information amounts are outputted (Step S19), and the operation returns from the present processing to the processing illustrated in FIG. 12.

Further, with reference to FIG. 14, description will be made of the processing of setting the tone conversion curve at the foregoing Step S4.

When the present processing starts, the information amount of the image signal is first formulized by the second order functional equation indicated in the Formula 4 (Step S20).

Then, the information amount of the noise is formulized by the second order functional equation indicated in the Formula 5 (Step S21).

Then, the tone conversation characteristic as indicated in the Formula 6 for maximizing the effective information amount is calculated on the basis of the Formula 8 (Step S22).

Subsequently, on the basis of the reference tone conversion curve and the tone conversion characteristic, the tone conversion curve maximizing the effective information amount is calculated (Step S23).

Thereafter, the calculated tone conversion curve is outputted (Step S24), and the operation returns from the present processing to the processing illustrated in FIG. 12.

Subsequently, with reference to FIG. 15, description will be made of the processing of estimating the amount of the noise at the foregoing Step S116.

When the present processing starts, local regions each having a predetermined size including a target pixel, e.g., 3×3-pixel unit local regions, are sequentially extracted, and the average values thereof are calculated (Step S30).

Subsequently, the parameter, such as the gain, is obtained from the read header information. Herein, if the header information does not include the necessary parameter, the processing of assigning a predetermined standard value is performed (Step S31).

Then, a table relating to the amount of the noise is read to output the amount of the noise (Step S32).

Thereafter, the amount of the noise is outputted (Step S33), and the operation returns from the present processing to the processing illustrated in FIG. 13.

According to the Embodiment 1 as described above, it is possible to calculate the tone conversion curve maximizing the effective information amount, which is obtained by subtracting the information amount of the noise from the information amount of the image signal. Therefore, the optimal tone conversion processing in consideration of the influence of the noise can be performed. As a result, a high quality image signal can be obtained.

Further, the information amount of the image signal and the information amount of the noise are calculated from the reduced image signal. Therefore, the processing speed can be increased.

Furthermore, the necessary tone conversion curves and the associated parameters are recorded in the ROM. Therefore, a variety of tone conversion curves can be used, and the degree of processing freedom is increased.

Further, the interested region is set on the basis of the feature value, such as the texture, and the information amounts are corrected in accordance with the weighting factors. Thus, the correlation between the information amount and subjective evaluation is improved. Accordingly, a subjectively more preferable high quality image signal can be obtained.

In addition, the multiplier coefficient with respect to the reference tone conversion curve is used as the tone conversion characteristic. Therefore, the required memory capacity is reduced, and the cost of the system can be reduced.

Further, the second order functional equations are used to formulize the information amounts. Therefore, the amount of calculation is relatively small, and the processing speed can be increased. Further, the compatibility for the transition of the information amount is high. Therefore, highly accurate formulization can be achieved.

Furthermore, various types of information relating to the amount of the noise are dynamically obtained in each shooting operation. Therefore, the amount of the noise can be highly accurately estimated.

In the above, the standard value is set by the standard value assignment unit. Thus, even if necessary information cannot be dynamically obtained, the amount of the noise can be estimated. As a result, a stable system can be established.

Further, as the image pickup device, the present embodiment uses the single image pickup device in front of which is arranged the Bayer-type primary color filter or the color-difference line-sequential type complementary color filter. Thus, the compatibility for current image pickup units is high. Therefore, the present embodiment can be easily applied to a large number of image pickup units.

Furthermore, if the configuration illustrated in FIGS. 9 and 10 is adopted, the tone conversion curve is adaptively calculated from the image signal in the processing of calculating the information amount. Therefore, the information amount can be highly accurately calculated for a variety of image signals. Further, the distance with respect to the reference tone conversion curve is used as the tone conversion characteristic. Therefore, the speed of calculating the derivative tone conversion curve can be increased.

Embodiment 2

Figure 16:
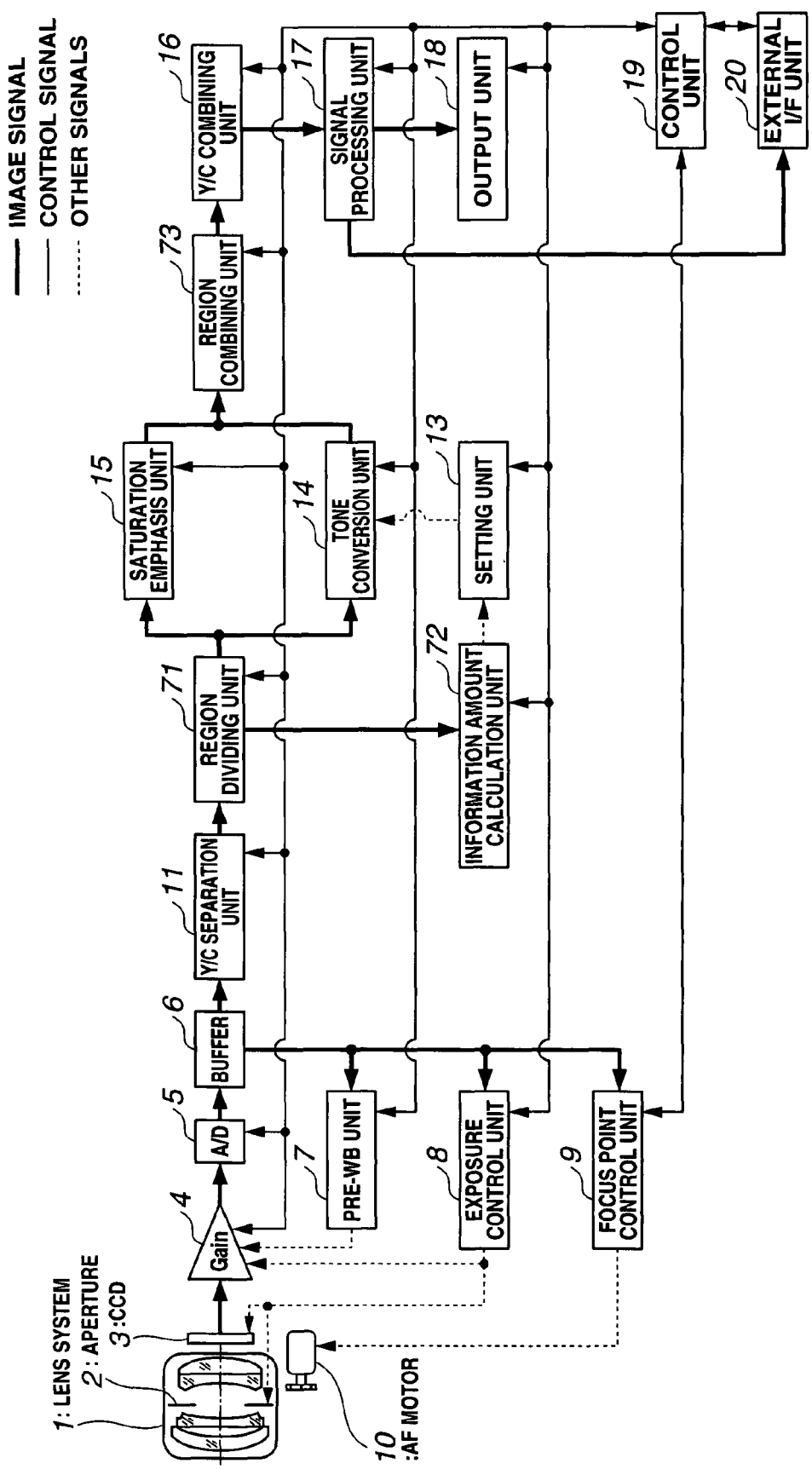
FIG. 16 is a block diagram illustrating a configuration of an image pickup apparatus in Embodiment 2 of the present invention.
Figure 17:
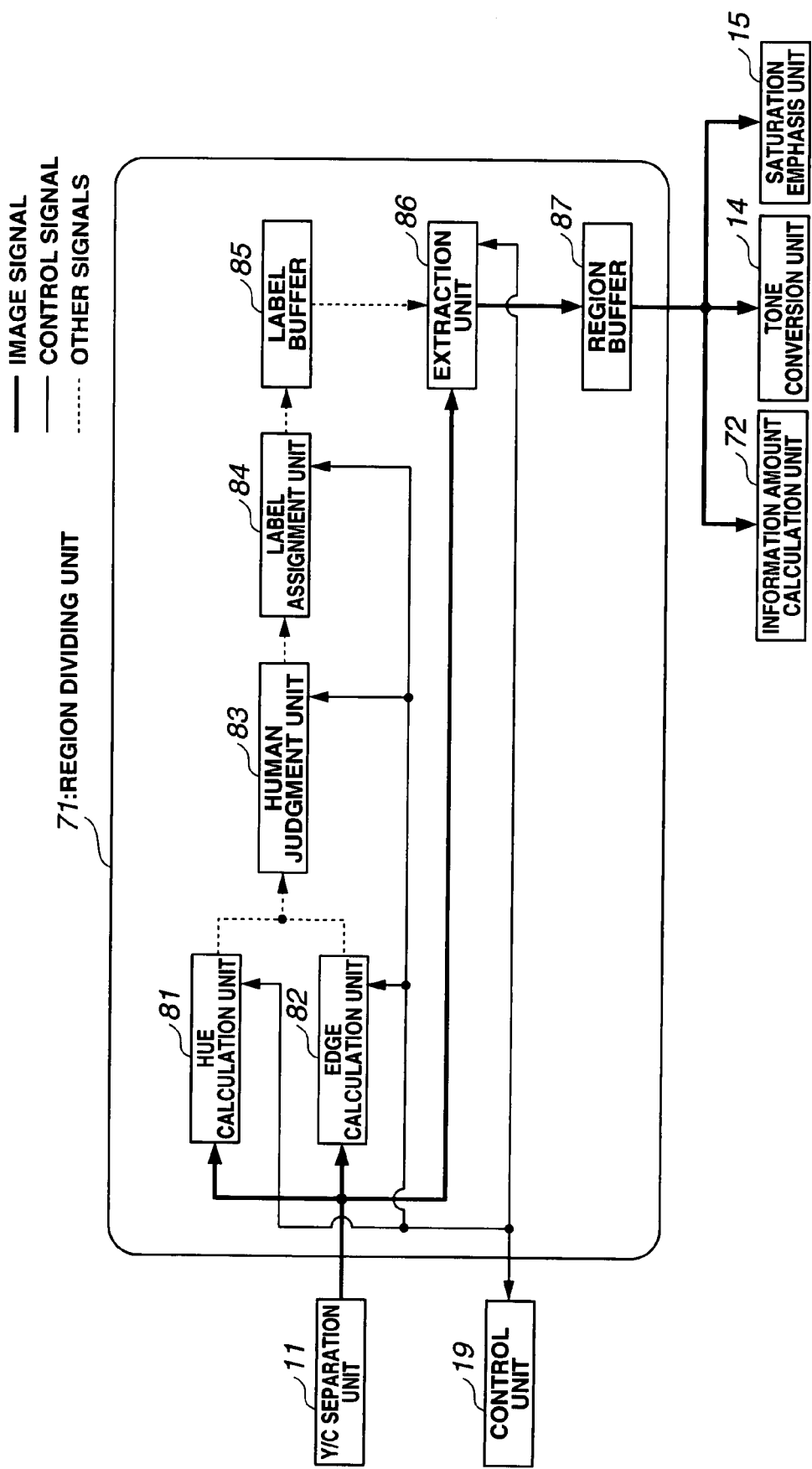
FIG. 17 is a block diagram illustrating a configuration of a region dividing unit in the Embodiment 2.
Figure 18:
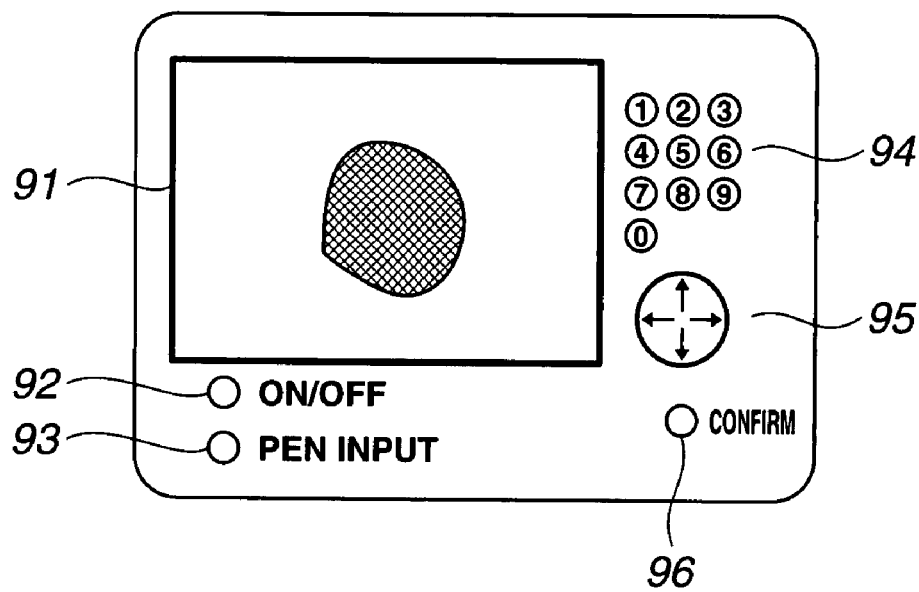
FIG. 18 is a diagram illustrating an example in which a region to be divided is inputted in a free form with the use of an external I/F unit in the Embodiment 2.
Figure 19:
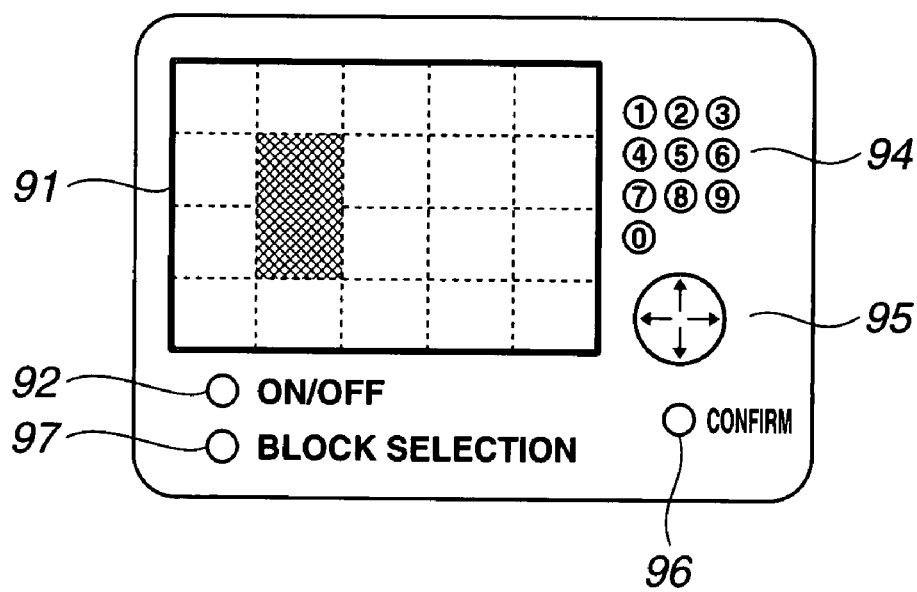
FIG. 19 is a diagram illustrating an example in which a region to be divided is inputted through the selection of a block region with the use of the external I/F unit in the Embodiment 2.
Figure 20:
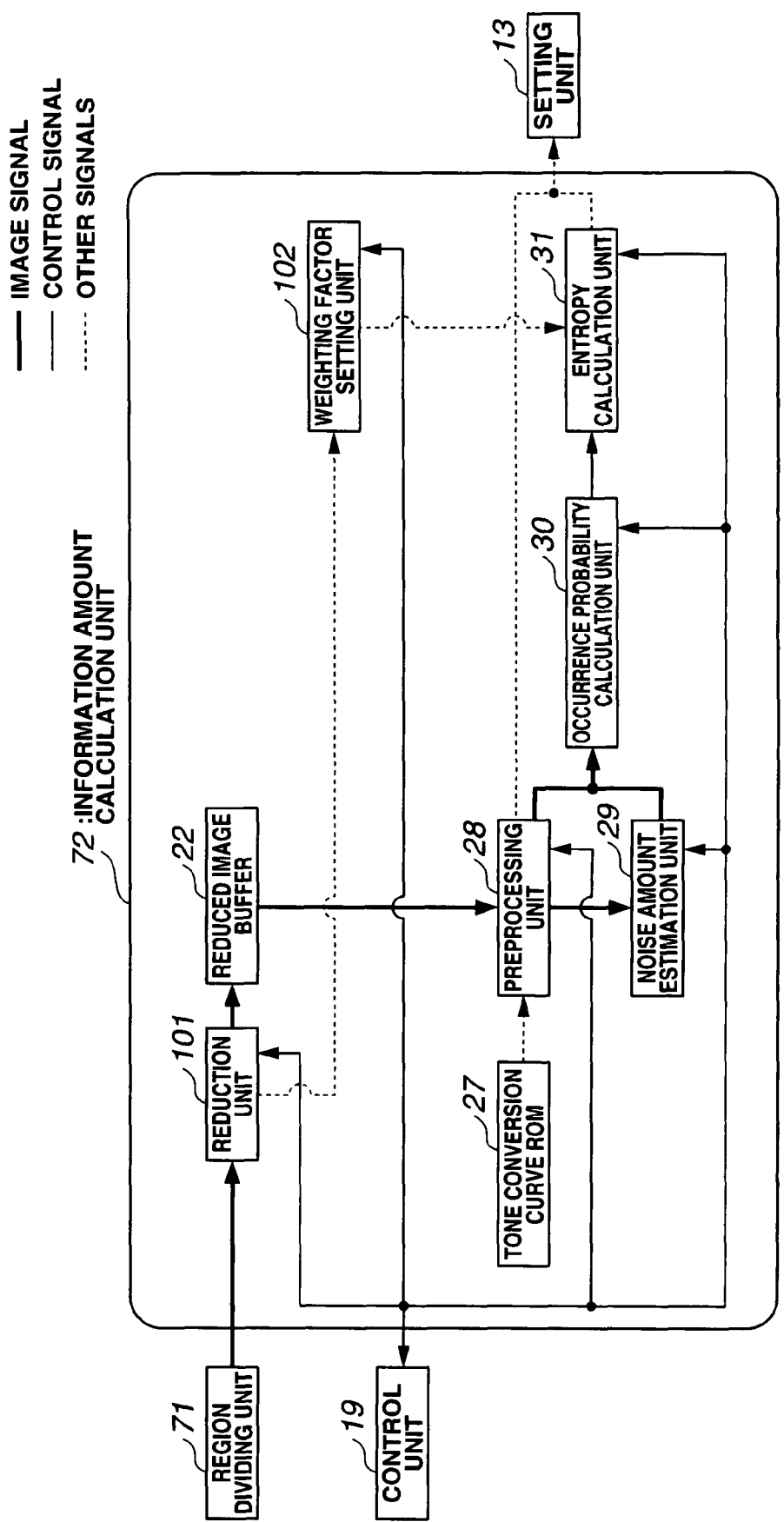
FIG. 20 is a block diagram illustrating a configuration of an information amount calculation unit in the Embodiment 2.
Figure 21:
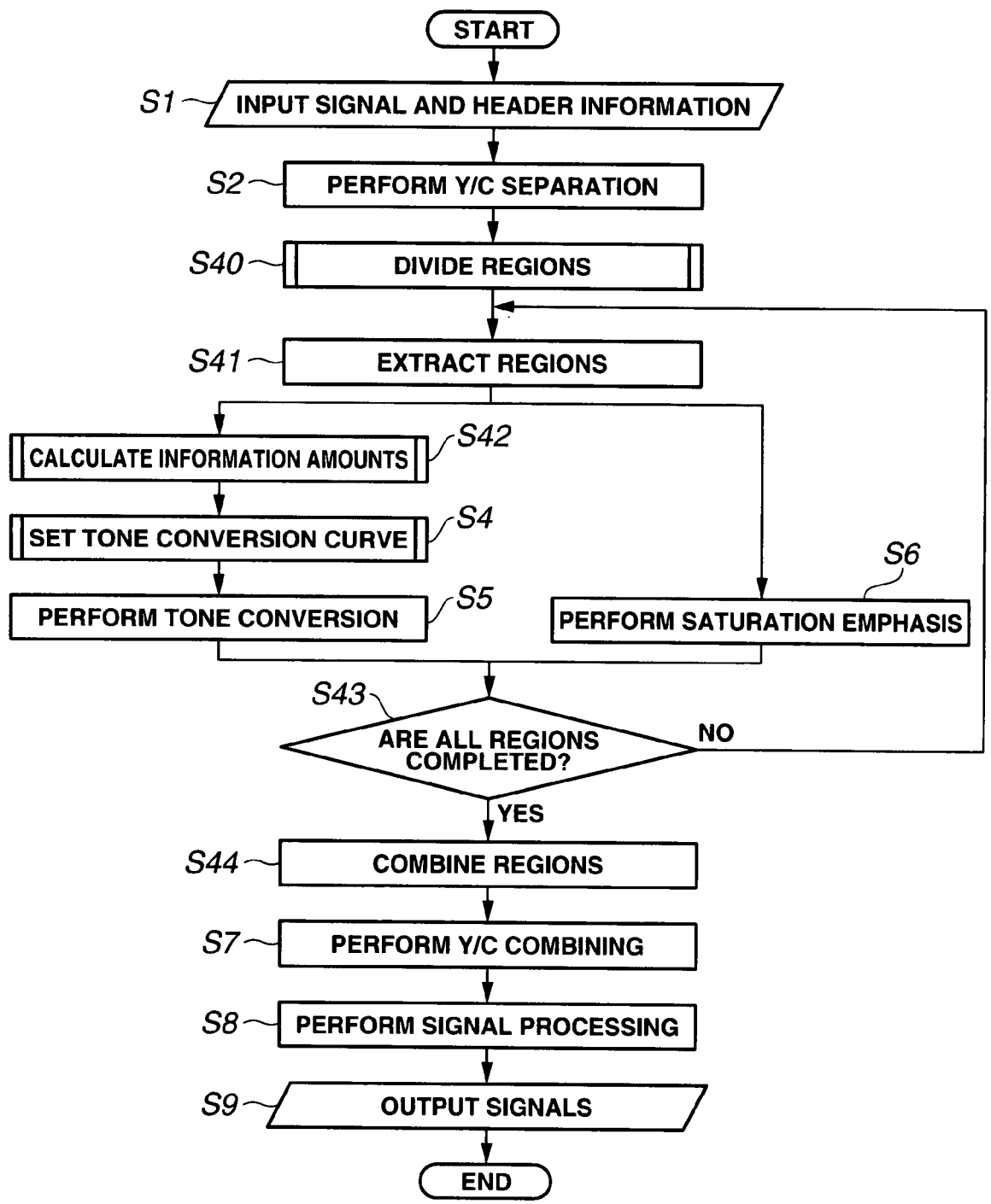
FIG. 21 is a flow chart illustrating the entirety of the processing by an image processing program of the Embodiment 2.

FIGS. 16 to 23 illustrate Embodiment 2 of the present invention. FIG. 16 is a block diagram illustrating a configuration of an image pickup apparatus. FIG. 17 is a block diagram illustrating a configuration of a region dividing unit. FIG. 18 is a diagram illustrating an example in which a region to be divided is inputted in a free form with the use of the external I/F unit. FIG. 19 is a diagram illustrating an example in which a region to be divided is inputted through the selection of a block region with the use of the external I/F unit. FIG. 20 is a block diagram illustrating a configuration of an information amount calculation unit. FIG. 21 is a flow chart illustrating the entirety of the processing by an image processing program. FIG. 22 is a flow chart illustrating the processing of dividing into regions in the image processing program. FIG. 23 is a flow chart illustrating the processing of calculating the information amount in the image processing program.

Parts of the Embodiment 2 similar to the parts of the foregoing Embodiment I will be assigned with the same reference numerals, and description thereof will be omitted. Only different points will be mainly described.

The image pickup apparatus according to the present embodiment is configured as illustrated in FIG. 16. As compared with the configuration of the Embodiment 1 illustrated in FIG. 1, the present embodiment is configured such that an information amount calculation unit 72 replaces the information amount calculation unit 12, and that a region dividing unit 71 and a region combining unit 73 are added. The present embodiment is similar in other basic configurations to the Embodiment 1 illustrated in FIG. 1.

The Y/C separation unit 11 is connected to the region dividing unit 71. The region dividing unit 71 is connected to the information amount calculation unit 72, the tone conversion unit 14, and the saturation emphasis unit 15.

Further, the information amount calculation unit 72 constituting information amount calculation means is connected to the tone conversion unit 14 via the setting unit 13.

Furthermore, the tone conversion unit 14 and the saturation emphasis unit 15 are connected to the region combining unit 73. The region combining unit 73 is further connected to the Y/C combining unit 16.

Further, the signal processing unit 17 is connected to the output unit 18, and is further connected to the external I/F unit 20.

The control unit 19 is bidirectionally connected to the region dividing unit 71, the information amount calculation unit 72, and the region combining unit 73 to control the respective units.

The operation of the image pickup apparatus as illustrated in FIG. 16 is basically similar to the operation of the foregoing Embodiment 1. Thus, only different parts will now be mainly described in accordance with the flow of signals.

The luminance signal Y and the color difference signals Cb and Cr transmitted from the Y/C separation unit 11 are transmitted to the region dividing unit 71.

On the basis of the control by the control unit 19, the region dividing unit 71 constituting dividing means calculates label signals for dividing the luminance signal Y and the color difference signals Cb and Cr into regions under a predetermined dividing condition. Herein, in the present embodiment, the predetermined dividing condition is for dividing the regions in accordance with whether or not a region is a human face region. In the dividing processing, a simple dividing operation can be performed in favor of the processing time on the basis of the determination that there is no overlapping region (a portion in which regions overlap with each other in the boundary). Alternatively, the dividing operation can be performed with the overlapping region set in the boundary in favor of the image quality. For the various signals outputted from the region dividing unit 71, the divided luminance signal Y is transmitted to the tone conversion unit 14, the divided color difference signals Cb and Cr are transmitted to the saturation emphasis unit 15, and the divided luminance signal Y and label signals are transmitted to the information amount calculation unit 72.

On the basis of the control by the control unit 19, the information amount calculation unit 72 calculates from the divided luminance signal Y the information amounts of the image signals $E\_img_j$ and the information amounts of the noise signals $E\_noise_j$ with respect to a plurality of tone conversion curves. The information amounts of the noise signals $E\_noise_j$ are corrected on the basis of the label signals transmitted from the region dividing unit 71. The information amounts of the image signals $E\_img_j$ and the information amounts of the noise signals $E\_noise_j$ calculated by the information amount calculation unit 72 and the tone conversion characteristics characterizing the plurality of tone conversion curves are transmitted to the setting unit 13.

On the basis of the control by the control unit 19, and from the information amounts of the image signals $E\_img_j$, the information amounts of the noise signals $E\_noise_j$, and the tone conversion characteristics transmitted from the information amount calculation unit 72, the setting unit 13 searches a tone conversion characteristic maximizing the effective information amount. Then, the setting unit 13 calculates a tone conversion curve corresponding to the searched tone conversion characteristic. The tone conversion curve calculated by the setting unit 13 is transmitted to the tone conversion unit 14.

On the basis of the control by the control unit 19, and with the use of the tone conversion curve transmitted from the setting unit 13, the tone conversion unit 14 performs the tone conversion on the divided luminance signal Y transmitted from the Y/C separation unit 11.

Further, on the basis of the control by the control unit 19, the saturation emphasis unit 15 performs the saturation emphasis processing on the divided color difference signals Cb and Cr transmitted from the Y/C separation unit 11 by multiplying the signals by a predetermined gain.

The above-described operations of the information amount calculation unit 72, the setting unit 13, the tone conversion unit 14, and the saturation emphasis unit 15 are sequentially performed for each of the regions on the basis of the control by the control unit 19.

The divided luminance signal Y transmitted from the tone conversion unit 14 and the divided color difference signals Cb and Cr transmitted from the saturation emphasis unit 15 are transmitted to the region combining unit 73, and are combined by the region combining unit 73 continuing combining means. Herein, if there is no overlapping region in the above-described dividing processing by the region dividing unit 71, the region combining unit 73 performs combining processing of simply integrating the regions. Meanwhile, if there is the overlapping region in the dividing processing by the region dividing unit 71, the region combining unit 73 performs weighting addition on two image signals in the overlapping region in accordance with the distance of the signals from the region, to thereby perform combining processing while improving the continuity of the boundary portion.

The luminance signal Y and the color difference signals Cb and Cr transmitted from the region combining unit 73 are transmitted to the Y/C combining unit 16, and the RGB signals are calculated by the Y/C combining unit 16, as indicated in the Formula 2. The RGB signals are transmitted to the signal processing unit 17.

The signal processing unit 17 performs, for example, a publicly known compression process, and transmits the processed image signal to the output unit 18. The signal processing unit 17 further performs resizing processing or the like to adjust the image signal to a display device included in the external I/F unit 20, and transmits, as needed, the processed image signal to the external I/F unit 20.

On the basis of the control by the control unit 19, the output unit 18 records and saves the image signal transmitted from the signal processing unit 17 in the recording medium, such as a memory card.

Subsequently, with reference to FIG. 17, description will be made of an example of the configuration of the region dividing unit 71.

The region dividing unit 71 is configured to include a hue calculation unit 81, an edge calculation unit 82, a human judgment unit 83, a label assignment unit 84, a label buffer 85, an extraction unit 86, and a region buffer 87.

The Y/C separation unit 11 is connected to the hue calculation unit 81, the edge calculation unit 82, and the extraction unit 86, respectively.

The hue calculation unit 81 and the edge calculation unit 82 are respectively connected to the region buffer 87 via the human judgment unit 83, the label assignment unit 84, the label buffer 85, and the extraction unit 86.

The region buffer 87 is connected to the information amount calculation unit 72, the tone conversion unit 14, and the saturation emphasis unit 15, respectively.

Further, the control unit 19 is bidirectionally connected to the hue calculation unit 81, the edge calculation unit 82, the human judgment unit 83, the label assignment unit 84, and the extraction unit 86 to control the respective units.

On the basis of the control by the control unit 19, the hue calculation unit 81 constituting feature value calculation means reads the color difference signals Cb and Cr from the Y/C separation unit 11, compares the read color difference signals Cb and Cr with a predetermined threshold value to extract skin color regions, and transmits the result of the extraction to the human judgment unit 83.

On the basis of the control by the control unit 19, the edge calculation unit 82 constituting feature value calculation means reads the luminance signal Y from the Y/C separation unit 11, compares the luminance signal Y with a predetermined threshold value to extract high-frequency regions corresponding to the frequency component of the hair, and transmits the result of the extraction to the human judgment unit 83.

On the basis of the control by the control unit 19, and on the basis of the information of the skin color regions transmitted from the hue calculation unit 81 and the high-frequency regions transmitted from the edge calculation unit 82, the human judgment unit 83 constituting feature value calculation means extracts regions judged to be a human face, and transmits the result of the extraction to the label assignment unit 84.

On the basis of the control by the control unit 19, the label assignment unit 84 constituting label assignment means assigns a predetermined label, e.g., "1," to the face regions and another predetermined label, e.g., "0," to the other regions, respectively, which are transmitted from the human determination unit 83.

The label signals outputted from the label assignment unit 84 are inputted and saved in the label buffer 85.

On the basis of the label signals stored in the label buffer 85, the extraction unit 86 separates the luminance signal Y and the color difference signals Cb and Cr transmitted from the Y/C separation unit 11 into the face regions and the other regions, and transmits the signals to the region buffer 87 with the label signals.

The luminance signal Y, the color difference signals Cb and Cr, and the label signal for each of the regions, which are stored in the region buffer 87, are transmitted, as needed, to the information amount calculation unit 72, the tone conversion unit 14, and the saturation emphasis unit 15.

In the configuration example described above, the region dividing unit 71 automatically performs the division of the human face regions on the basis of the information of the color and the frequency. However, the configuration is not limited to the above. For example, the configuration may be modified such that the division of the regions is manually performed, as illustrated in FIG. 18 or 19.

With reference to FIG. 18, description will now be made of an example of the specific configuration of the external I/F unit 20 relating to the manual division of the regions.

FIG. 18 illustrates a variety of operation switches, the display device, and so forth, which are arranged in the outer surface (e.g., the back surface) of the image pickup apparatus.

That is, as the constituent components included in the foregoing external I/F unit 20, the image pickup apparatus includes a liquid crystal 91 (image display means and region setting means), which is a display device configured as a touch panel, for example, and constituting an input device, a liquid crystal ON/OFF switch 92 for performing an ON/OFF operation of the liquid crystal 91, a pen input switch 93 constituting region setting means for shifting the mode to a pen input mode, numeric keys 94 arranged to enable the input of respective numbers from zero to nine, a selection key 95 configured as a cross key, for example, for performing a selection operation, and a confirmation switch 96 constituting region setting means for performing an operation of confirming an inputted region.

To manually specify a main subject region in the above-described configuration, the ON operation is first performed with the liquid crystal ON/OFF switch 92. Thereby, the image signal transmitted from the signal processing unit 17 is read by the external I/F unit 20, and is displayed on the liquid crystal 91.

Thereafter, the mode is shifted to the pen input mode through the operation of the pen input switch 93, and a closed curve is drawn on the liquid crystal 91 with a pen or the like to specify the main subject region. The specified main subject region is displayed on the liquid crystal 91 in superimposition on the image of the subject, as illustrated in FIG. 18.

Then, through the operation of the confirmation switch 96, the control unit 19 extracts the portion inside the specified closed curve as the main subject region, and transmits the region to the region dividing unit 71.

The region dividing unit 71 performs the division of the regions by generating the label signals so as to distinguish the transmitted main subject region from the other region.

Subsequently, with reference to FIG. 19, description will be made of another example of the specific configuration of the external I/F unit 20 relating to the manual division of the regions.

As the constituent components included in the foregoing external I/F unit 20, the present example includes the liquid crystal 91 constituting image display means and block selection means, the liquid crystal ON/OFF switch 92, the numeric keys 94, the selection key 95 constituting block selection means, the confirmation switch 96 constituting block selection means, and a block selection switch 97 constituting block selection means for shifting the mode to a block selection mode. In the configuration illustrated in FIG. 19, the liquid crystal 91 does not need to constitute the input device, unlike in the foregoing description. Thus, an ordinary liquid crystal panel can be used instead of the touch panel.

To manually specify the main subject region in the above-described configuration, similarly as in the foregoing description, the ON operation is first performed with the liquid crystal ON/OFF switch 92. Thereby, the image signal transmitted from the signal processing unit 17 is read by the external I/F unit 20, and is displayed on the liquid crystal 91.

Thereafter, the block selection switch 97 is operated to shift the mode to the block selection mode. Thereby, a dividing line indicating a block region of a predetermined size is displayed in superimposition on an image on the liquid crystal 91. Through the operation of the selection key 95 by a user, a target block is moved to another block, and a desired block is changed into the target block. Then, the confirmation switch 96 is operated to select the block region. The thus selected block region is displayed in highlight or the like, for example, to display that the block region has been selected. In the above process, a plurality of blocks can be selected as the target blocks through the operation of another operation key or the like as well as the operation of the selection key 95, for example. Further, the configuration may be modified such that the size of the block region in the image can be arbitrarily changed by an another operation.

When the confirmation switch 96 has been thus operated, the control unit 19 extracts the specified block region as the main subject region, and transmits the region to the region dividing unit 71.

The region dividing unit 71 performs the division of the regions by generating the label signals so as to distinguish the transmitted main subject region from the other region.

Subsequently, with reference to FIG. 20, description will be made of an example of the configuration of the information amount calculation unit 72.

The information amount calculation unit 72 is configured to include a reduction unit 101, the reduced image buffer 22, a weighting factor setting unit 102, the tone conversion curve ROM 27, the preprocessing unit 28, the noise amount estimation unit 29, the occurrence probability calculation unit 30, and the entropy calculation unit 31.

The configuration of the information amount calculation unit 72 is basically similar to the configuration of the information amount calculation unit 12 of the Embodiment 1 illustrated in FIG. 4, but is different in that the reduction unit 101 and the weighting factor setting unit 102 replace the reduction unit 21 and the weighting factor setting unit 25, respectively, and that the texture analysis unit 23, the interested region extraction unit 24, and the weighting factor buffer 26 are omitted.

The region dividing unit 71 is connected to the reduction unit 101. Further, the reduction unit 101 is connected to the reduced image buffer 22 and the weighting factor setting unit 102.

The reduced image buffer 22 is connected to the preprocessing unit 28.

The weighting factor setting unit 102 constituting weighting factor setting means is connected to the entropy calculation unit 31.

Further, the control unit 19 is bidirectionally connected to the reduction unit 101 and the weighting factor setting unit 102 to control the respective units.

On the basis of the control by the control unit 19, the reduction unit 101 reads from the region dividing unit 71 the divided luminance signal Y and the corresponding label signal for each of the regions, and reduces the divided luminance signal and the label signal at a predetermined reduction ratio. The reduced luminance signal Y from the reduction unit 101 is transmitted to the reduced image buffer 22. Further, the reduction unit 101 transmits the reduced label signal to the weighting factor setting unit 102.

On the basis of the reduced label signal transmitted from the reduction unit 101, the weighting factor setting unit 102 determines whether a currently processed region is the face region (the label "1" in the present embodiment) or the other region (the label "0"). Herein, if the weighting factor setting unit 102 determines that the currently processed region is the face region, the weighting factor setting unit 102 determines that the region is sensitive to the increase of the noise, and outputs an instruction to the entropy calculation unit 31 to increment the information amounts of the noise signals $E\_noise_j$, which are calculated by the entropy calculation unit 31, by an increment of a predetermined amount, e.g., an increment of 20%. Meanwhile, if the weighting factor setting unit 102 determines that the currently processed region is the region except for the face region, the weighting factor setting unit 102 does not output the above-described instruction for incrementing the information amounts of the noise signal.

The occurrence probability calculation unit 30 calculates the occurrence probabilities $Pro\_img_j(i)$ and $Pro\_noise_j(i)$, similarly as in the occurrence probability calculation unit 30 in the information amount calculation unit 12 of the Embodiment 1. The occurrence probability calculation unit 30, however, does not perform the correction of the weighting factor relating to the interested region.

Similarly as in the entropy calculation unit 31 in the information amount calculation unit 12 of the Embodiment 1, the entropy calculation unit 31 calculates the entropies $E\_img_j$ as the information amounts of three types of image signals on the basis of three types of occurrence probabilities $Pro\_img_j(i)$, and calculates the entropies $E\_noise_j$ as the information amounts of three types of noise signals on the basis of three types of occurrence probabilities $Pro\_noise_j(i)$. Further, if the increment instruction relating to the information amounts of the noise signal is outputted from the weighting factor setting unit 102, the entropy calculation unit 31 increments the information amounts of the noise signal by a predetermined increment, which is an increment of 20% in the present embodiment.

It is assumed in the above description that the processing is performed by hardware. However, the processing is not limited to the above. For example, the processing can be performed by software. That is, it is possible to record the image signal transmitted from the CCD 3 in the recording medium, such as a memory card, as unprocessed Raw data, record the associated information, such as the image pickup conditions transmitted from the control unit 19, in the recording medium as the header information, connect the recording medium to a computer, and execute an image processing program on the computer to perform the processing. Needless to say, the Raw data transmitted from the CCD 3 can be inputted to the computer directly or via a communication line, not through the recording medium.

With reference to FIG. 21, the processing by the image processing program will be described. Parts of FIG. 21 similar to the processes of the Embodiment 1 illustrated in FIG. 12 will be assigned with the same reference numerals, and description thereof will be accordingly omitted.

After the Step S2, the division of the regions and the calculation of the label signals are performed, as described later with reference to FIG. 22 (Step S40).

Subsequently, the region and the label signal corresponding to the region are sequentially extracted (Step S41).

Then, as described later with reference to FIG. 23, the information amounts of the image signal and the information amounts of the noise signal with respect to a plurality of tone conversion curves are calculated from the luminance signal (Step S42).

Thereafter, the foregoing processes of the Steps S4 to S6 are performed.

Subsequently, it is determined whether or not the extraction of all regions has been completed (Step S43). If the extraction has not been completed, the operation returns to the Step S41 to repeat the above-described processes on a next region.

Meanwhile, if it is determined at the Step S43 that the extraction of all regions has been completed, the regions are combined (Step S44).

Thereafter, the foregoing processes of the Steps S7 to S9 are performed. At the Step S8, as previously described, the resizing processing or the like is performed, as needed, to adjust the image signal to the display device. With the process of the Step S9 thus performed, the present processing is completed.

Subsequently, with reference to FIG. 22, description will be made of the processing of dividing into the regions at the foregoing Step S40.

As the present processing starts, the skin color regions are first extracted from the image signal (Step S50).

Meanwhile, the high-frequency regions corresponding to the frequency component of the hair are extracted from the image signal (Step S51).

Further, on the basis of the information of the skin color regions extracted at the Step S50 and the information of the high-frequency regions extracted at the Step S51, the regions judged to be a human face are extracted (Step S52).

Then, the face regions are assigned with a predetermined label, e.g., "1," and the other regions are assigned with another predetermined label, e.g., "0" (Step S53).

Thereafter, the regions are separated into the face regions and the other regions, and the regions signals are outputted together with the label signals (Step S54). Then, the operation returns from the present processing to the processing illustrated in FIG. 21.

Subsequently, with reference to FIG. 23, description will be made of the processing of calculating the information amounts at the foregoing Step S42. Parts of FIG. 23 similar to the processes of the Embodiment 1 illustrated in FIG. 13 will be assigned with the same reference numerals, and description thereof will be accordingly omitted.

Subsequent to the process of the Step S110, on the basis of the label signals, it is determined whether a region is the face region (the label "1" in the present embodiment) or the other region (the label "0"). If the region is the face region, a weighting factor of +20% is set for the information amount of the noise signal. Meanwhile, if the region is the other region, a weighting factor of 0% is set for the information amount of the noise signal (Step S60).

Meanwhile, subsequent to the process of the Step S10, the foregoing processes of the Steps S14 to S17 are performed.

Then, on the basis of the entropies indicated in the Formula 3, the information amounts of the image signal and the information amounts of the noise signal are calculated, and the information amounts of the noise signal are corrected on the basis of the weighting factors set at the Step S60 (Step S61).

Thereafter, the process of the Step S119 is performed, and the operation returns from the present processing to the processing illustrated in FIG. 21.

Similarly as described in the Embodiment 1, the present embodiment is also not limited to the configuration in which the image processing apparatus is integrated with the image pickup unit. That is, for example, it is possible to record the image signal picked up by a separate image pickup unit in the recording medium, such as a memory card, in the form of unprocessed Raw data, record the associated information, such as the image pickup conditions, in the recording medium as the header portion or the like, and connect the recording medium to an image processing apparatus substantially similar to the image processing apparatus illustrated in FIG. 11, which is obtained by removing the image pickup unit from the image processing apparatus illustrated in FIG. 16, to thereby perform the processing through the image processing apparatus.

Further, in the above description, the tone conversion curve is adaptively calculated from the image signal. The present embodiment, however, does not need to be limited to the above configuration. For example, it is possible to configure the present embodiment such that the tone conversion curves are read from a ROM, similarly as in the foregoing Embodiment 1.

Furthermore, in the above description, the present embodiment is configured to correct the information amounts of the noise signal on the basis of the weighting factor. The present embodiment, however, is not limited to the above configuration. For example, the present embodiment may be configured so as to correct the information amounts of the image signal, or to correct both the information amounts of the image signal and the information amounts of the noise signal.

According to the thus configured Embodiment 2, it is possible to exert substantially similar effects to the effects of the foregoing Embodiment 1, and to divide the image signal into regions and calculate the tone conversion curve maximizing the effective information amount for each of the regions. Accordingly, the optimal tone conversion processing in consideration of the influence of the noise can be performed. As a result, a high quality image signal can be obtained.

Further, the tone conversion processing is independently performed for each region. Therefore, appropriate processing can be performed also on a scene of a wide dynamic range.

Furthermore, the regions are set on the basis of the feature values, such as the color and the frequency, and the information amounts of the noise signal are corrected for each of the set regions on the basis of the weighting factors. Thus, the correlation between the information amount and subjective evaluation is improved. Accordingly, a subjectively more preferable high quality image signal can be obtained.

Further, in the manual setting of the interested region with the use of the liquid crystal, the image signal can be appropriately divided into the regions intended by a photographer. Accordingly, a subjectively preferable high quality image signal can be obtained.

Furthermore, the image signals of the respective regions subjected to the tone conversion processing are combined. Thus, conventional processing systems and output devices can be employed. Accordingly, the versatility of the system is improved.

Embodiment 3

Figure 24:
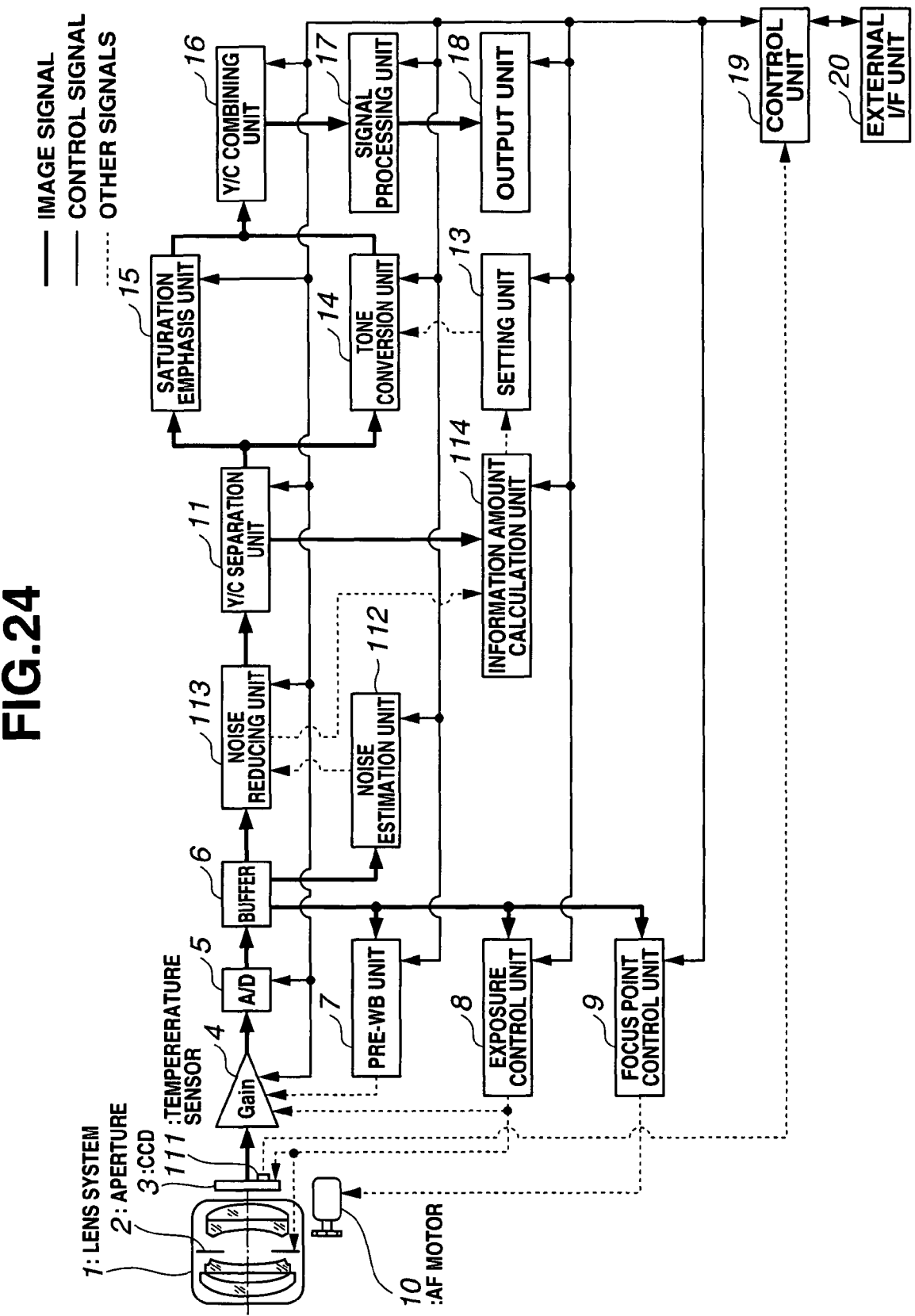
FIG. 24 is a block diagram illustrating a configuration of an image pickup apparatus in Embodiment 3 of the present invention.
Figure 25:
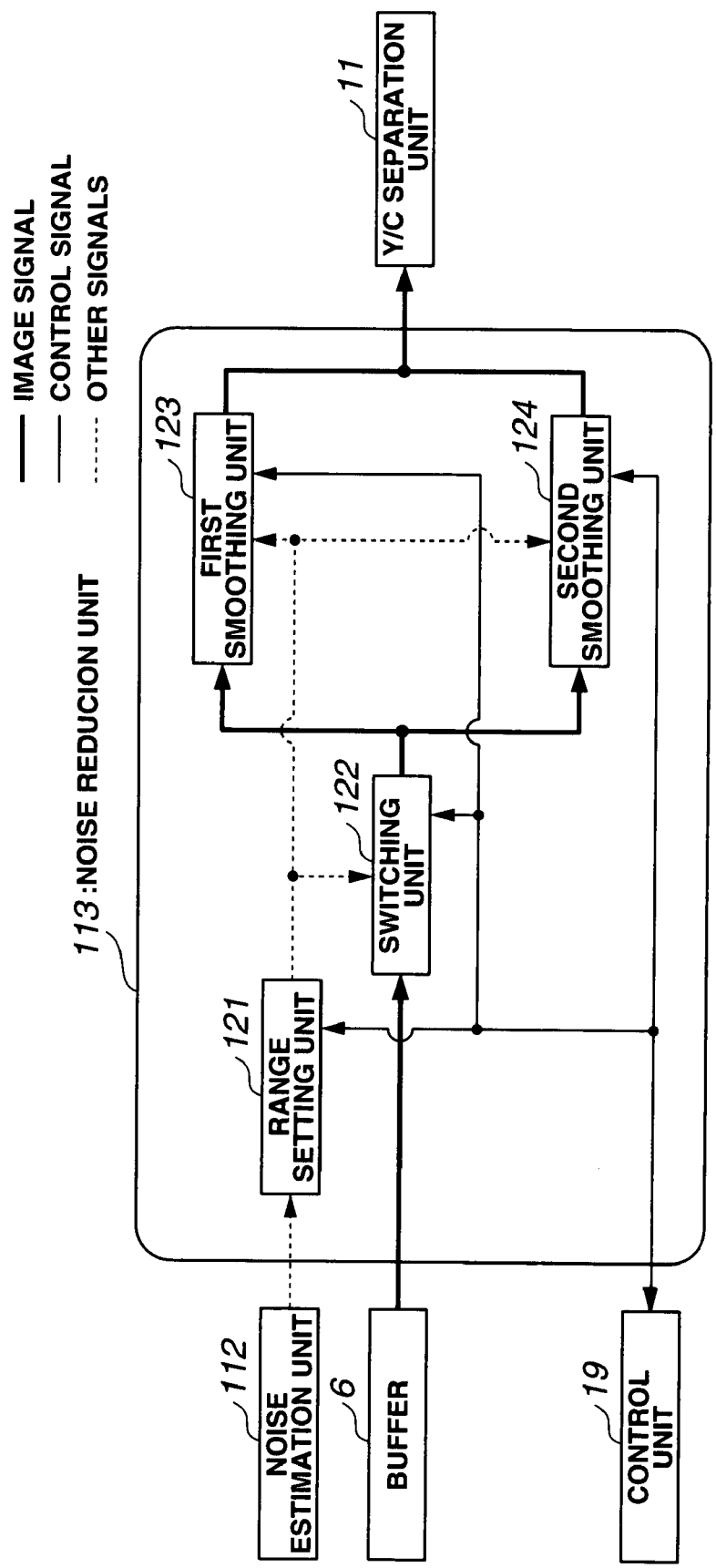
FIG. 25 is a block diagram illustrating a configuration of a noise reducing unit in the Embodiment 3.
Figure 26:
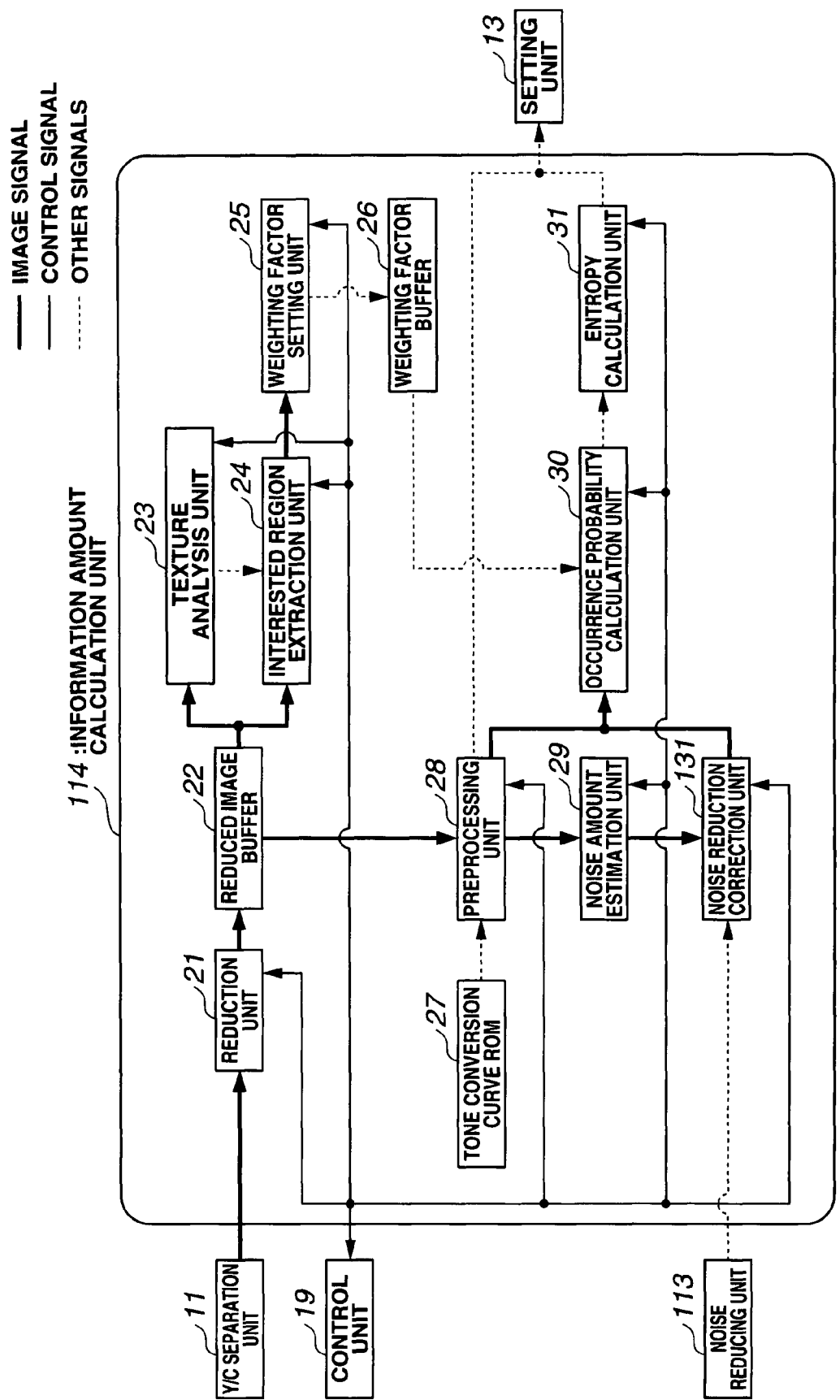
FIG. 26 is a block diagram illustrating a configuration of an information amount calculation unit in the Embodiment 3.
Figure 27:
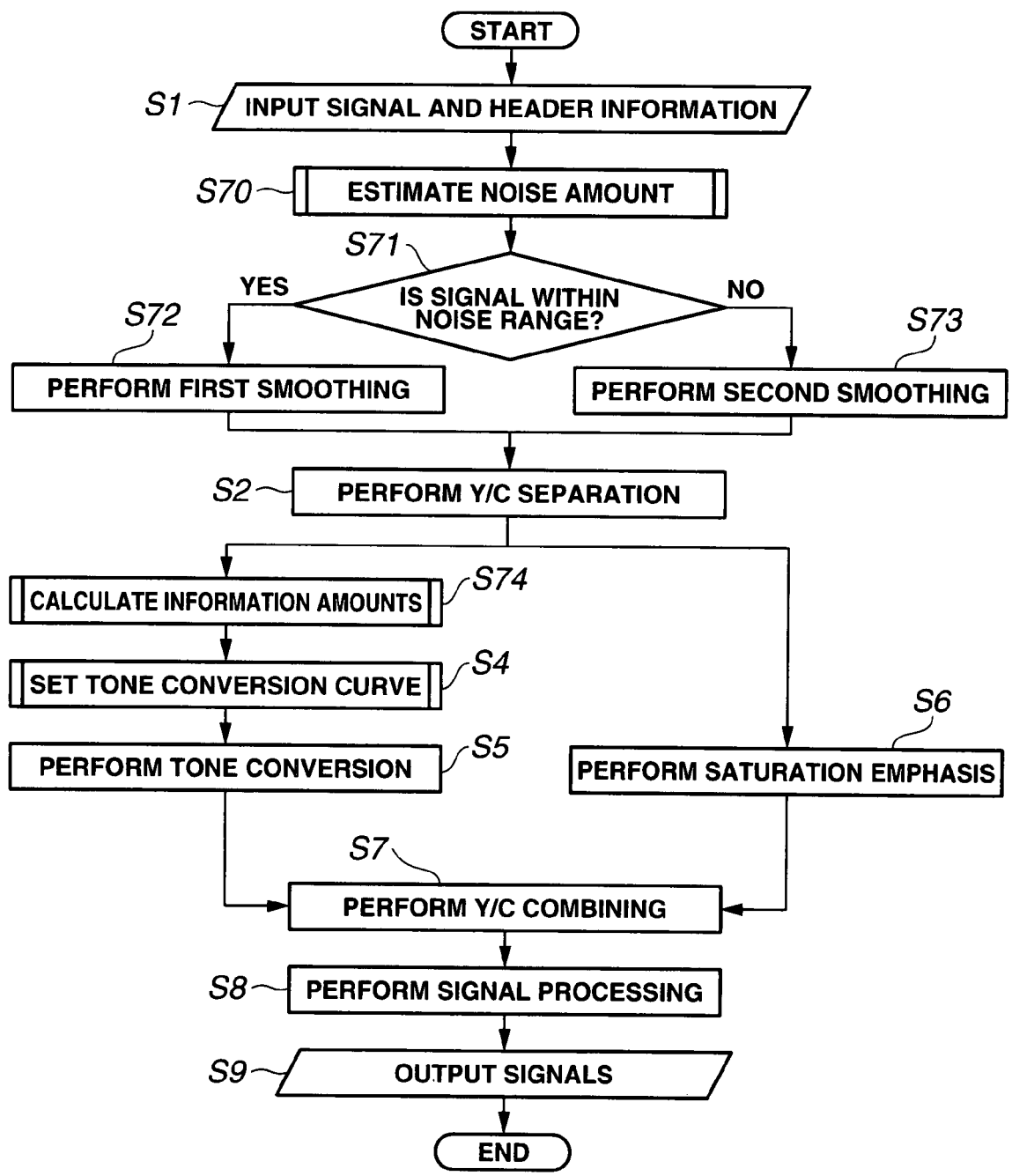
FIG. 27 is a flow chart illustrating the entirety of the processing by an image processing program of the Embodiment 3.
Figure 28:
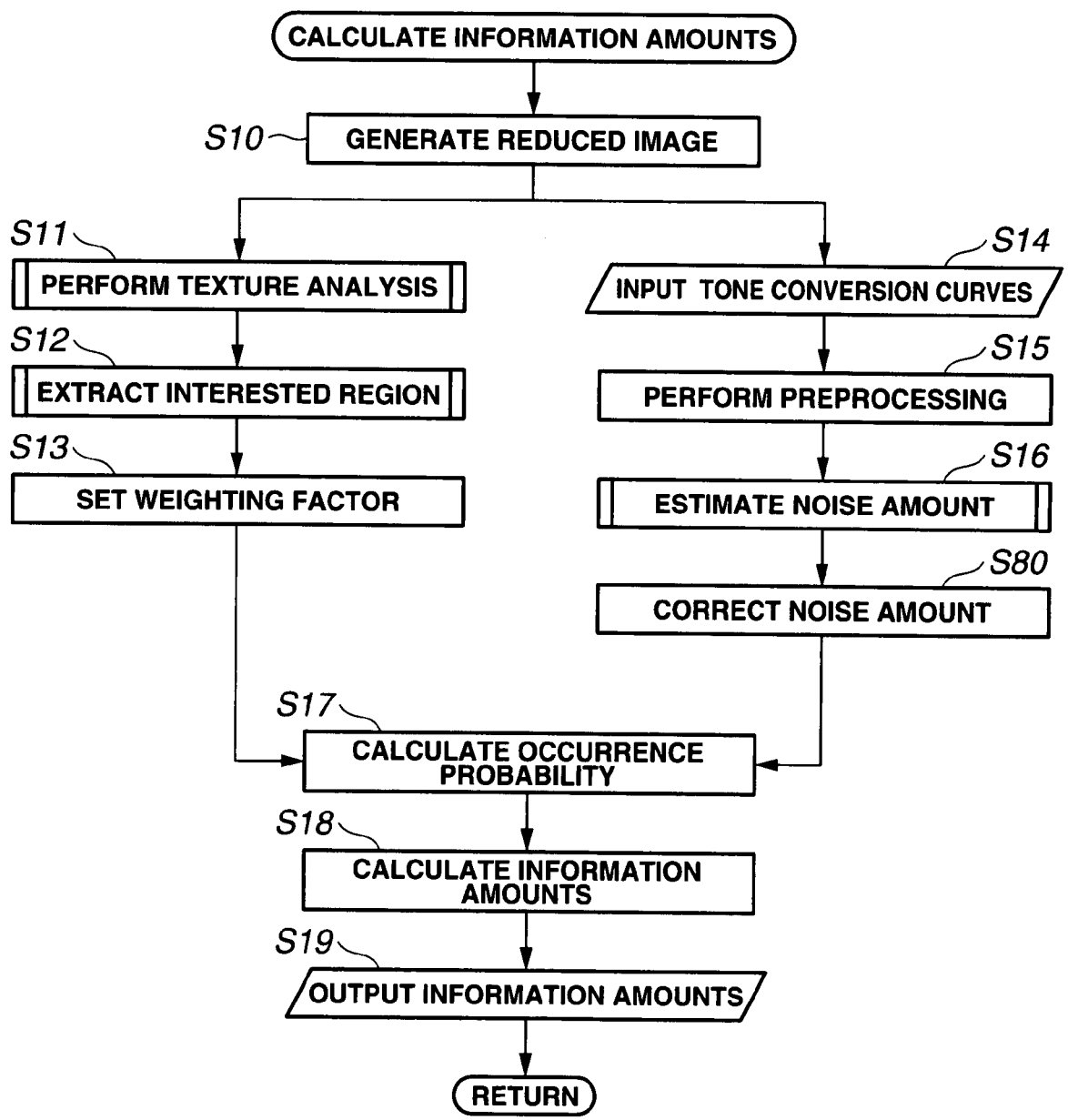
FIG. 28 is a flow chart illustrating the processing of calculating the information amount in the image processing program of the Embodiment 3.

FIGS. 24 to 28 illustrate Embodiment 3 of the present invention. FIG. 24 is a block diagram illustrating a configuration of an image pickup apparatus. FIG. 25 is a block diagram illustrating a configuration of a noise reducing unit. FIG. 26 is a block diagram illustrating a configuration of an information amount calculation unit. FIG. 27 is a flow chart illustrating the entirety of the processing by an image processing program. FIG. 28 is a flow chart illustrating the processing of calculating the information amount in the image processing program.

Parts of the Embodiment 3 similar to the parts of the foregoing Embodiments 1 and 2 will be assigned with the same reference numerals, and description thereof will be omitted. Only different points will be mainly described.

The image pickup apparatus according to the present embodiment is configured as illustrated in FIG. 24. As compared with the configuration of the Embodiment 1 illustrated in FIG. 1, the present embodiment is configured such that an information amount calculation unit 114 replaces the information amount calculation unit 12, and that a temperature sensor 111, a noise estimation unit 112, and a noise reducing unit 113 are added. The present embodiment is similar in other basic configurations to the Embodiment 1 illustrated in FIG. 1.

The temperature sensor 111 is arranged in the neighborhood of the CCD 3 to detect the temperature of the CCD 3, and a signal representing the result of the detection is outputted to the control unit 19.

The buffer 6 is connected to the Pre-WB unit 7, the exposure control unit 8, and the focus control unit 9, and is further connected to the noise estimation unit 112 and the noise reducing unit 113, respectively.

The noise estimation unit 112 is connected to the noise reducing unit 113.

The noise reducing unit 113 is connected to the Y/C separation unit 11 and the information amount calculation unit 114, respectively.

The Y/C separation unit 11 is connected to the tone conversion unit 14 and the saturation emphasis unit 15, and is further connected to the information amount calculation unit 114.

The information amount calculation unit 114 constituting information amount calculation means is connected to the setting unit 13.

Further, the control unit 19 is bidirectionally connected to the noise estimation unit 112, the noise reducing unit 113, and the information amount calculation unit 114 to control the respective units.

The operation of the image pickup apparatus as illustrated in FIG. 24 is basically similar to the operation of the foregoing Embodiment 1. Thus, only different parts will now be mainly described in accordance with the flow of signals.

The image signal stored in the buffer 6 is transmitted to the noise estimation unit 112.

The noise estimation unit 112 constituting noise estimation means is basically similar to the noise amount estimation unit 29 of the Embodiment 1 illustrated in FIG. 6. However, the noise estimation unit 112 is different from the noise amount estimation unit 29 in that, while the noise amount estimation unit 29 reads the luminance signal from the preprocessing unit 28, the present noise estimation unit 112 reads the signal transmitted from the buffer 6, i.e., the signal transmitted from the CCD 3 constituting the single image pickup device in front of which is arranged the Bayer-type primary color filter as illustrated in FIG. 2. Further, on the basis of the above-described arrangement of the Bayer-type color filter, the average calculation unit 41 performs the processing of separating the signal into the RGB signals and calculating individual average values. Furthermore, while the standard value assignment unit 43 transmits a predetermined temperature value to the noise LUT 44 as the operation temperature of the CCD 3 in the foregoing noise amount estimation unit 29, the control unit 19 transmits a temperature value obtained from the temperature sensor 111 to the noise LUT 44 in the present noise estimation unit 112. Further, the noise LUT 44 constitutes a lookup table recording therein the relationship relating to the three signals of R, G, and B among the signal value level of the image signal, the amount of amplification of the image signal, the operation temperature of the image pickup device, and the amount of the noise. Thereby, on the basis of the control by the control unit 19, the noise estimation unit 112 estimates the amount of the noise with respect to a target pixel to be subjected to noise reduction processing, and transmits the estimated noise amount to the noise reducing unit 113.

On the basis of the control by the control unit 19, the noise reducing unit 113 constituting noise reducing means first determines whether or not the target pixel belongs to the noise. Then, if the noise reducing unit 113 determines that the target pixel belongs to the noise, the noise reducing unit 113 performs smoothing processing. Meanwhile, if the noise reducing unit 113 determines that the target pixel does not belong to the noise, the noise reducing unit 113 performs correction processing to ensure the continuity. The image signal thus subjected to the noise-related processing is transmitted from the noise reducing unit 113 to the Y/C separation unit 11. Further, information relating to the smoothing processing is transmitted from the noise reducing unit 113 to the information amount calculation unit 114.

The above-described processes by the noise estimation unit 112 and the noise reducing unit 113 are performed in synchronization with each other for each target pixel on the basis of the control by the control unit 19.

On the basis of the control by the control unit 19, the Y/C separation unit 11 performs a publicly known interpolation process on each of the RGB signals to convert the single signal into three signals. Thereafter, the Y/C separation unit 11 calculates the luminance signal Y and the color difference signals Cb and Cr, as indicated in the Formula 1.

On the basis of the control by the control unit 19, the information amount calculation unit 114 calculates, from the luminance signal Y separated by the Y/C separation unit 11, the information amounts of the image signals $E\_img_j$ and the information amounts of the noise signals $E\_noise_j$ with respect to a plurality of tone conversion curves. Further, on the basis of the information relating to the smoothing processing transmitted from the noise reducing unit 113, the information amount calculation unit 114 corrects the information amounts of the noise signals $E\_noise_j$. The information amount calculation unit 114 transmits to the setting unit 13 the thus calculated information amounts of the image signals $E\_img_j$ and information amounts of the noise signals $E\_noise_j$ and the tone conversion characteristics characterizing the plurality of tone conversion curves.

The processes subsequent thereafter are similar to the processes described in the Embodiment 1.

Subsequently, with reference to FIG. 25, an example of the configuration of the noise reducing unit 113 will be described.

The noise reducing unit 113 is configured to include a range setting unit 121, a switching unit 122, a first smoothing unit 123, and a second smoothing unit 124.

The noise estimation unit 112 is connected to the range setting unit 121.

The range setting unit 121 is connected to the switching unit 122, the first smoothing unit 123, and the second smoothing unit 124.

The buffer 6 is connected to the switching unit 122.

The switching unit 122 is connected to the first smoothing unit 123 and the second smoothing unit 124.

The first smoothing unit 123 and the second smoothing unit 124 are connected to the Y/C separation unit 11.

The control unit 19 is bidirectionally connected to the range setting unit 121, the switching unit 122, the first smoothing unit 123, and the second smoothing unit 124 to control the respective units.

The thus configured noise reducing unit 113 operates as follows.

The noise estimation unit 112 transmits the average value AV and the noise amount N, which are calculated for each of the three RGB signals, to the range setting unit 121.

On the basis of the control by the control unit 19, the range setting unit 121 constituting noise range setting means sets an upper limit Up and a lower limit Low, as indicated in the following Formula 11, as a permissible range relating to the noise amounts of the three RGB signals.

$$Up = AV + N/2$$

$$Low = AV - N/2 \qquad \text{Formula 11}$$

Then, the range setting unit 121 transmits the permissible range Up and Low to the switching unit 122. Further, the range setting unit 121 transmits the average value AV and the noise amount N, which are calculated for each of the three RGB signals, to the first smoothing unit 123 and the second smoothing unit 124, respectively.

On the basis of the control by the control unit 19, the switching unit 122 reads the image signal of the target pixel from the buffer 6, and determines whether or not the image signal falls within the above-described permissible range. Herein, the determination made by the switching unit 122 is one of the following three: the image signal of the target pixel is "within the noise range," "over the noise range," and "below the noise range." Then, if the switching unit 112 determines that the image signal of the target pixel is "within the noise range," the switching unit 112 transmits the image signal of the target pixel to the first smoothing unit 123. In the cases except for the above case, the switching unit 112 transmits the image signal of the target pixel to the second smoothing unit 124.

The first smoothing unit 123 constituting first smoothing means performs the processing of substituting the average value AV, which is transmitted from the range setting unit 121, in the image signal Pix of the target pixel transmitted from the switching unit 122.

$$Pix=AV \quad \text{Formula 12}$$

The RGB signals subjected to the smoothing processing on the basis of the Formula 12 are transmitted to the Y/C separation unit 11. The performance of the smoothing processing by the Formula 12 varies depending on the size of the local region used to calculate the average value AV (the size of 3×3 pixels is assumed in the present embodiment). The performance of the smoothing is improved by increasing the size of the local region, for example. If the size of the local region is increased, however, a side effect, such as blurring of an edge portion, is also increased. Therefore, the size of the local region is generally changed on the basis of a shooting condition, such as the ISO sensitivity and the night view scene. The above-described performance of the smoothing (e.g., improvement of 3 dB is obtained by setting 3×3 pixels for the local region, and improvement of 5 dB is obtained by setting 5×5 pixels for the local region) is previously examined and transmitted to the information amount calculation unit 114 as the information relating to the smoothing processing.

Further, with the use of the average value AV and the noise amount N transmitted from the range setting unit 121, the second smoothing unit 124 constituting second smoothing means performs the correction processing on the image signal Pix of the target pixel transmitted from the switching unit 122. Firstly, if the image signal of the target pixel is "over the noise range," the second smoothing unit 124 performs the correction, as indicated in the following Formula 13.

$$Pix=Pix-N/2 \quad \text{Formula 13}$$

Meanwhile, if the image signal of the target pixel is "below the noise range," the second smoothing unit 124 performs the correction, as indicated in the following Formula 14.

$$Pix=Pix+N/2 \quad \text{Formula 14}$$

The RGB signals subjected to the correction processing by the Formula 13 or 14 are transmitted from the second smoothing unit 124 to the Y/C separation unit 11.

Subsequently, with reference to FIG. 26, an example of the configuration of the information amount calculation unit 114 will be described.

The information amount calculation unit 114 is configured to include the reduction unit 21, the reduced image buffer 22, the texture analysis unit 23, the interested region extraction unit 24, the weighting factor setting unit 25, the weighting factor buffer 26, the tone conversion curve ROM 27, the preprocessing unit 28, the noise amount estimation unit 29, the occurrence probability calculation unit 30, the entropy calculation unit 31, and a noise reduction correction unit 131.

The configuration of the information amount calculation unit 114 is basically similar to the configuration of the information amount calculation unit 12 of the Embodiment 1 illustrated in FIG. 4, and is added with the noise reduction correction unit 131.

The noise reducing unit 113 and the noise amount estimation unit 29 are respectively connected to the noise reduction correction unit 131.

The noise reduction correction unit 131 is connected to the occurrence probability calculation unit 30.

The control unit 19 is bidirectionally connected to the noise reduction correction unit 131 to control the unit.

A part of the operation of the information amount calculation unit 114 illustrated in FIG. 26 different from the operation of the information amount calculation unit 12 of the Embodiment 1 is as follows.

The noise reduction correction unit 131 constituting correction means receives from the noise reducing unit 113 the information relating to the performance of the smoothing processing, such as the information of the improvement of 3 dB, for example. Then, on the basis of the received information, the noise reduction correction unit 131 attenuates a noise component corresponding to the degree of improvement effect obtained by the smoothing processing performed for the noise signal transmitted from the noise amount estimation unit 29.

The thus attenuated noise signal is transmitted from the noise reduction correction unit 131 to the occurrence probability calculation unit 30.

The processes subsequent thereafter are similar to the processes described on the information amount calculation unit 12 in the Embodiment 1.

It is assumed in the above description that the processing is performed by hardware. However, the processing is not limited to the above. For example, the processing can be performed by software. That is, it is possible to record the image signal transmitted from the CCD 3 in the recording medium, such as a memory card, as unprocessed Raw data, record the associated information, such as the image pickup conditions transmitted from the control unit 19, in the recording medium as the header information, connect the recording medium to a computer, and execute an image processing program on the computer to perform the processing. Needless to say, the Raw data transmitted from the CCD 3 can be inputted to the computer directly or via a communication line, not through the recording medium.

With reference to FIG. 27, the processing by the image processing program will be described. Parts of FIG. 27 similar to the processes of the Embodiment 1 illustrated in FIG. 12 will be assigned with the same reference numerals, and description thereof will be accordingly omitted.

After the Step S1, the amount of the noise is estimated, as illustrated in FIG. 15 (Step S70).

Then, it is determined whether or not the image signal of the target pixel falls within the permissible range as indicated in the Formula 11 (Step S71).

Herein, if it is determined that the image signal of the target pixel falls within the permissible range, the processing as indicated in the Formula 12 is performed (Step S72).

Meanwhile, if it is determined that the image signal of the target pixel does not fall within the permissible range, the processing as indicated in the Formula 13 or 14 is performed (Step S73).

After the Step S72 or S73, the process of the Step S2 is then performed. Thereafter, as described later with reference to FIG. 28, the information amounts of the image signal and the information amounts of the noise signal with respect to a plurality of tone conversion curves are calculated with the use of the luminance signal Y (Step S74).

Thereafter, the processes of the Steps S4 to S9 are performed, and the present processing is completed.

Subsequently, with reference to FIG. 28, description will be made of the processing of calculating the information amounts at the above-described Step S74. Parts of FIG. 28 similar to the processes of the Embodiment 1 illustrated in FIG. 13 will be assigned with the same reference numerals, and description thereof will be accordingly omitted.

After the Steps S10 to S16, the noise component corresponding to the degree of improvement effect obtained by the above-described smoothing processing of the Step S72 is attenuated (Step S80).

Thereafter, the processes of the Steps S17 to S19 are performed, similarly as in the foregoing description. Then, the operation returns to the processing illustrated in FIG. 27.

In the above description, the noise estimation unit 112 and the noise amount estimation unit 29 of the information amount calculation unit 114 are separately configured. The configuration, however, is not limited to the above. The functions of the two units are basically the same. Thus, the configuration may be modified such that either one of the units is omitted.

According to the thus configured Embodiment 3, substantially similar effects to the effects of the foregoing Embodiments 1 and 2 are exerted. Further, the noise reduction processing is performed on the image signal to calculate the tone conversion curve maximizing the effective information amount in consideration of the influence of the noise remaining after the noise reduction processing. Accordingly, the optimal tone conversion processing can be performed. As a result, a high quality image signal can be obtained.

Further, the information amount of the noise can be highly accurately calculated also in the system combined with the noise reduction processing. Accordingly, the performances of both the noise reduction processing and the tone conversion processing can be given to its maximum.

Furthermore, in the noise reduction processing, the smoothing processing is performed on the target pixel determined to fall within the noise range and the correction processing is performed on the target pixel determined not to fall within the noise range. It is therefore possible to obtain a high quality signal by preventing the occurrence of discontinuity.

Embodiment 4

Figure 29:
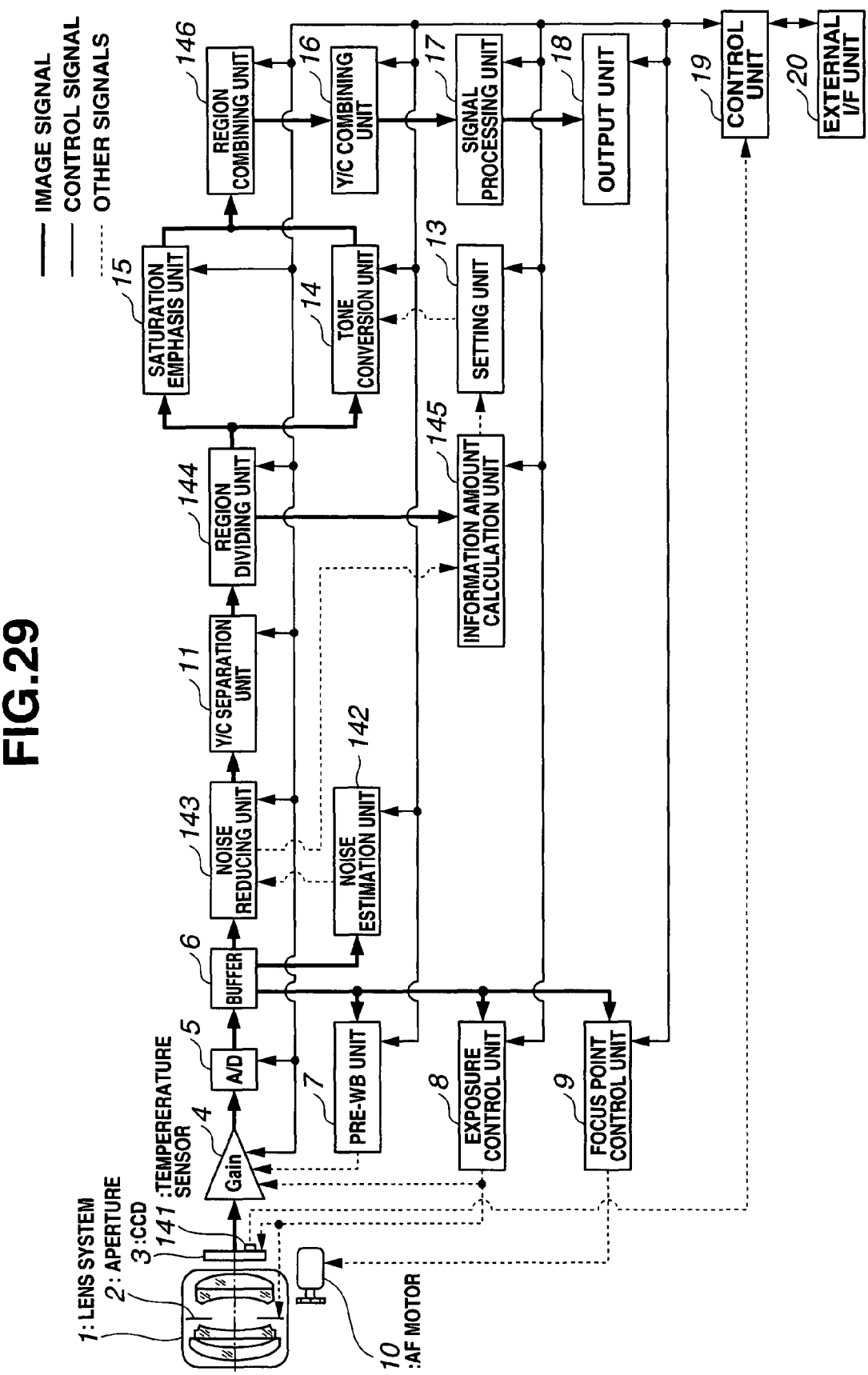
FIG. 29 is a block diagram illustrating a configuration of an image pickup apparatus in Embodiment 4 of the present invention.

FIGS. 29 and 30 illustrate Embodiment 4 of the present invention. FIG. 29 is a block diagram illustrating a configuration of an image pickup apparatus. FIG. 30 is a flow chart illustrating the entirety of the processing by an image processing program.

Parts of the Embodiment 4 similar to the parts of the foregoing Embodiments 1 to 3 will be assigned with the same reference numerals, and description thereof will be omitted. Only different points will be mainly described.

The image pickup apparatus according to the present embodiment is configured as illustrated in FIG. 29. As compared with the configuration of the Embodiment 1 illustrated in FIG. 1, the present embodiment is configured such that an information amount calculation unit 145 replaces the information amount calculation unit 12, and that a temperature sensor 141, a noise estimation unit 142, a noise reducing unit 143, a region dividing unit 144, and a region combining unit 146 are added. The present embodiment is similar in other basic configurations to the Embodiment 1 illustrated in FIG. 1.

The temperature sensor 141 is arranged in the neighborhood of the CCD 3 to detect the temperature of the CCD 3, and a signal representing the result of the detection is outputted to the control unit 19.

The buffer 6 is connected to the Pre-WB unit 7, the exposure control unit 8, and the focus control unit 9, and is further connected to the noise estimation unit 142 and the noise reducing unit 143, respectively.

The noise estimation unit 142 is connected to the noise reducing unit 143.

The noise reducing unit 143 is connected to the Y/C separation unit 11 and the information amount calculation unit 145, respectively.

The Y/C separation unit 11 is connected to the region dividing unit 144.

The region dividing unit 144 is connected to the information amount calculation unit 145, the tone conversion unit 14, and the saturation emphasis unit 15, respectively.

The information amount calculation unit 145 constituting information amount calculation means is connected to the tone conversion unit 14 via the setting unit 13.

The tone conversion unit 14 and the saturation emphasis unit 15 are connected to the region combining unit 146.

The region combining unit 146 is connected to the Y/C combining unit 16.

Further, the control unit 19 is bidirectionally connected to the noise estimation unit 142, the noise reducing unit 143, the region dividing unit 144, the information amount calculation unit 145, and the region combining unit 146 to control the respective units.

The operation of the image pickup apparatus as illustrated in FIG. 29 is basically similar to the operation of the foregoing Embodiment 1. Thus, only different parts will be mainly described in accordance with the flow of signals.

The image signal stored in the buffer 6 is transmitted to the noise estimation unit 142.

Similarly to the noise estimation unit 112 of the foregoing Embodiment 3, the noise estimation unit 142 constituting noise estimation means estimates the amount of the noise with respect to a target pixel to be subjected to the noise reduction processing, and transmits the estimated noise amount to the noise reducing unit 143.

On the basis of the control by the control unit 19, the noise reducing unit 143 constituting noise reducing means first determines whether or not the target pixel belongs to the noise. Then, if the noise reducing unit 143 determines that the target pixel belongs to the noise, the noise reducing unit 143 performs smoothing processing. Meanwhile, if the noise reducing unit 143 determines that the target pixel does not belong to the noise, the noise reducing unit 143 performs correction processing to ensure the continuity. The image signal thus subjected to the noise reduction processing is transmitted from the noise reducing unit 143 to the Y/C separation unit 11. Further, information relating to the smoothing processing is transmitted from the noise reducing unit 143 to the information amount calculation unit 145.

The above-described processes by the noise estimation unit 142 and the noise reducing unit 143 are performed in synchronization with each other for each target pixel on the basis of the control by the control unit 19.

On the basis of the control by the control unit 19, the Y/C separation unit 11 performs a publicly known interpolation process on each of the RGB signals to convert the single signal into three signals. Thereafter, the Y/C separation unit 11 calculates the luminance signal Y and the color difference signals Cb and Cr, as indicated in the Formula 1. The luminance signal Y and the color difference signals Cb and Cr calculated by the Y/C separation unit 11 are transmitted to the region dividing unit 144.

On the basis of the control by the control unit 19, the region dividing unit 144 constituting dividing means calculates the label signals for dividing the luminance signal Y and the color difference signals Cb and Cr into regions under a predetermined dividing condition, similarly as in the foregoing Embodiment 2. For the various signals outputted from the region dividing unit 144, the divided luminance signal Y is transmitted to the tone conversion unit 14, the divided color difference signals Cb and Cr are transmitted to the saturation emphasis unit 15, and the divided luminance signal Y and label signals are transmitted to the information amount calculation unit 145.

On the basis of the control by the control unit 19, the information amount calculation unit 145 calculates, from the divided luminance signal Y, the information amounts of the image signals E_img$_j$ and the information amounts of the noise signals E_noise$_j$ with respect to a plurality of tone conversion curves. Further, on the basis of the label signals transmitted from the region dividing unit 144, the information amount calculation unit 145 performs correction of the information amounts of the noise signals E_noise$_j$. Further, on the basis of the information relating to the smoothing processing transmitted from the noise reducing unit 143, the information amount calculation unit 145 corrects the information amounts of the noise signals E_noise$_j$. The thus calculated information amounts of the image signals E_img$_j$ and information amounts of the noise signals E_noise$_j$ and tone conversion characteristics characterizing the plurality of tone conversion curves are transmitted to the setting unit 13.

On the basis of the control by the control unit 19, and from the information amounts of the image signals E_img$_j$, the information amounts of the noise signals E_noise$_j$, and the tone conversion characteristics transmitted from the information amount calculation unit 145, the setting unit 13 searches a tone conversion characteristic maximizing the effective information amount, and calculates a tone conversion curve corresponding to the searched tone conversion characteristic. The tone conversion curve calculated by the setting unit 13 is transmitted to the tone conversion unit 14.

On the basis of the control by the control unit 19, and with the use of the tone conversion curve transmitted from the setting unit 13, the tone conversion unit 14 performs the tone conversion on the divided luminance signal Y transmitted from the Y/C separation unit 11.

Further, on the basis of the control by the control unit 19, the saturation emphasis unit 15 performs the saturation emphasis processing on the divided color difference signals Cb and Cr by multiplying the signals by a predetermined gain.

The above-described operations of the information amount calculation unit 145, the setting unit 13, the tone conversion unit 14, and the saturation emphasis unit 15 are sequentially performed for each of the regions on the basis of the control by the control unit 19.

The divided luminance signal Y transmitted from the tone conversion unit 14 and the divided color difference signals Cb and Cr transmitted from the saturation emphasis unit 15 are transmitted to the region combining unit 146 and combined by the region combining unit 146 constituting combining means.

The luminance signal Y and the color difference signals Cb and Cr transmitted from the region combining unit 146 are transmitted to the Y/C combining unit 16. Then, the RGB signals are calculated by the Y/C combining unit 16, as indicated in the Formula 2, and are transmitted to the signal processing unit 17.

The processes subsequent thereafter are similar to the processes described in the Embodiment 1.

It is assumed in the above description that the processing is performed by hardware. However, the processing is not limited to the above. For example, the processing can be performed by software. That is, it is possible to record the image signal transmitted from the CCD 3 in the recording medium, such as a memory card, as unprocessed Raw data, record the associated information, such as the image pickup conditions transmitted from the control unit 19, in the recording medium as the header information, connect the recording medium to a computer, and execute an image processing program on the computer to perform the processing. Needless to say, the Raw data transmitted from the CCD 3 can be inputted to the computer directly or via a communication line, not through the recording medium.

With reference to FIG. 30, the processing by the image processing program will be described. Parts of FIG. 30 similar to the processes of the Embodiment 1 illustrated in FIG. 12 will be assigned with the same reference numerals, and description thereof will be accordingly omitted.

After Step S1, the amount of the noise is estimated, as illustrated in FIG. 15 (Step S90).

Then, it is determined whether or not the image signal of the target pixel falls within the permissible range as indicated in the Formula 11 (Step S91).

Herein, if it is determined that the image signal of the target pixel falls within the permissible range, the processing as indicated in the Formula 12 is performed (Step S92).

Meanwhile, if it is determined that the image signal of the target pixel does not fall within the permissible range, the processing as indicated in the Formula 13 or 14 is performed (Step S93).

After the Step S92 or S93, the process of the Step S2 is then performed. Thereafter, as illustrated in FIG. 22, the division of the regions and the calculation of the label signals are performed (Step S94).

Then, the region and the label signal corresponding to the region are sequentially extracted (Step S95).

Then, as illustrated in FIG. 23, the information amounts of the image signal and the information amounts of the noise signal with respect to a plurality of tone conversion curves are calculated from the luminance signal (Step S96).

Thereafter, the foregoing processes of the Steps S4 to S6 are performed.

Subsequently, it is determined whether or not the extraction of all regions has been completed (Step S97). If the extraction has not been completed, the operation returns to the Step S95 to repeat the above-described processes on a next region.

Meanwhile, if it is determined at the Step S97 that the extraction of all regions has been completed, the regions are combined (Step S98).

Thereafter, the foregoing processes of the Steps S7 to S9 are performed, and the present processing is completed.

According to the thus configured Embodiment 4, substantially similar effects to the effects of the foregoing Embodiments 1 to 3 are exerted. Further, the noise reduction processing and the region dividing processing are performed on the image signal to calculate the tone conversion curve maximizing the effective information amount in consideration of the influence of the noise remaining after the noise reduction processing. Accordingly, the optimal tone conversion processing can be performed. As a result, a high quality image signal can be obtained.

Further, the information amount of the noise can be highly accurately calculated also in the system combined with the noise reduction processing. Accordingly, the performances of both the noise reduction processing and the tone conversion processing can be given to its maximum.

Furthermore, the tone conversion processing is independently performed for each region. Accordingly, the degree of freedom is increased, and a high quality image signal can be obtained also in a scene of a wide dynamic range.

Needless to day, the present invention is not limited to the embodiments described above, and can be modified and applied in various ways within a scope not departing from the gist of the invention.

What is claimed is:

1. An image processing apparatus for performing tone conversion processing on an image signal obtained from an image pickup system, the image processing apparatus comprising:
   information amount calculation means for calculating entropies representing an information amount relating to the image signal and entropies representing an information amount relating to noise from the image signal;
   setting means for setting a tone conversion curve used in the tone conversion processing based on the information amount relating to the image signal and the information amount relating to the noise; and
   tone conversion means for performing the tone conversion processing on the image signal based on the tone conversion curve.

2. The image processing apparatus according to claim 1, comprising:
   dividing means for dividing the image signal into a plurality of regions,
   wherein the information amount calculation means calculates the entropies relating to the information amount relating to the image signal and the entropies representing the information amount relating to the noise, from the image signal of the regions,
   wherein the tone conversion means performs the tone conversion processing on the image signal of the regions, and
   wherein the image processing apparatus further comprises control means for performing a control to sequentially apply the information amount calculation means, the setting means, and the tone conversion means to each of the regions.

3. The image processing apparatus according to claim 1, comprising:
   noise estimation means for estimating a noise amount of the image signal for each pixel or each predetermined unit area; and
   noise reducing means for performing noise reduction processing on the image signal based on the noise amount,
   wherein the information amount calculation means calculates the entropies relating to the information amount relating to the image signal and the entropies representing the information amount relating to the noise, from the image signal subjected to the noise reduction processing, and
   wherein the tone conversion means performs the tone conversion processing on the image signal subjected to the noise reduction processing.

4. The image processing apparatus according to claim 3, comprising:
   dividing means for dividing the image signal subjected to the noise reduction processing into a plurality of regions,
   wherein the information amount calculation means calculates the entropies relating to the information amount relating to the image signal and the entropies representing the information amount relating to the noise, from the image signal subjected to the noise reduction processing and divided into the regions,
   wherein the tone conversion means performs the tone conversion processing on the image signal of the regions subjected to the noise reduction processing, and
   wherein the image processing apparatus further comprises control means for performing a control to sequentially apply the information amount calculation means, the setting means, and the tone conversion means to each of the regions.

5. The image processing apparatus according to claim 1, wherein the information amount calculation means includes:
   reduction means for reducing the image signal at a predetermined reduction ratio to convert the image signal into a reduced image signal,
   preprocessing means for performing the tone conversion processing on the reduced image signal using a plurality of tone conversion curves of different tone characteristics,
   first calculation means for calculating the information amount relating to the image signal from the reduced image signal subjected to the tone conversion processing,
   noise estimation means for estimating a noise amount of the reduced image signal subjected to the tone conversion processing for each pixel or each predetermined unit area, and
   second calculation means for calculating the information amount relating to the noise from the noise amount.

6. The image processing apparatus according to claim 2, wherein the information amount calculation means includes:
   reduction means for reducing the image signal of the regions at a predetermined reduction ratio to convert the image signal into a reduced image signal,
   preprocessing means for performing the tone conversion processing on the reduced image signal using a plurality of tone conversion curves of different tone characteristics,
   first calculation means for calculating the information amount relating to the image signal from the reduced image signal subjected to the tone conversion processing,
   noise estimation means for estimating a noise amount of the reduced image signal subjected to the tone conversion processing for each pixel or each predetermined unit area, and
   second calculation means for calculating the information amount relating to the noise from the noise amount.

7. The image processing apparatus according to claim 3, wherein the information amount calculation means includes:
   reduction means for reducing the image signal at a predetermined reduction ratio to convert the image signal into a reduced image signal,
   preprocessing means for performing the tone conversion processing on the reduced image signal of using a plurality of tone conversion curves of different tone characteristics, first calculation means for calculating the information amount relating to the image signal from the reduced image signal subjected to the tone conversion processing, second noise estimation means for estimating a noise amount of the reduced image signal subjected to the tone conversion processing for each pixel or each predetermined unit area, second calculation means for calculating the information amount relating to the noise from the noise amount of the reduced image signal, and correction means for performing a correction corresponding to a reduction effect obtained by the noise reduction processing for the information amount of the noise.

8. The image processing apparatus according to claim 4, wherein the information amount calculation means includes:

reduction means for reducing the image signal of the regions at a predetermined reduction ratio to convert the image signal into a reduced image signal, preprocessing means for performing the tone conversion processing on the reduced image signal using a plurality of tone conversion curves of different tone characteristics, first calculation means for calculating the information amount relating to the image signal from the reduced image signal subjected to the tone conversion processing, second noise estimation means for estimating a noise amount of the reduced image signal subjected to the tone conversion processing for each pixel or each predetermined unit area, second calculation means for calculating the information amount relating to the noise from the noise amount of the reduced image signal, and correction means for performing a correction corresponding to a reduction effect obtained by the noise reduction processing for the information amount relating to the noise.

9. The image processing apparatus according to claim 5, wherein the preprocessing means includes recording means for recording a predetermined reference tone conversion curve, derivative tone conversion curves each generated by multiplying the reference tone conversion curve by a predetermined multiplier coefficient, and the multiplier coefficient.

10. The image processing apparatus according to claim 5, wherein the preprocessing means includes correct region extraction means for extracting a correct exposure region based on a level of the image signal, edge calculation means for calculating an edge amount of the correct exposure region, histogram creation means for creating a histogram on the basis of the edge amount, tone conversion curve calculation means for calculating the tone conversion curve based on the histogram, distance calculation means for calculating a distance between the tone conversion curve and a predetermined reference tone conversion curve, and generation means for generating a derivative tone conversion curve by adjusting the distance.

11. The image processing apparatus according to claim 1, wherein the information amount calculation means includes:

interested region extraction means for extracting an interested region from the image signal, weighting factor setting means for setting a weighting factor for the interested region, and weighting factor correction means for performing correction on at least one of the information amount relating to the image signal and the information amount relating to the noise, based on the weighting factor.

12. The image processing apparatus according to claim 11, wherein the interested region extraction means includes feature value calculation means for calculating from the image signal a feature value relating to at least one of the color, the frequency, and the texture.

13. The image processing apparatus according to claim 2, wherein the information amount calculation means includes:

weighting factor setting means for setting a weighting factor for the regions, and weighting factor correction means for performing correction on at least one of the information amount relating to the image signal and the information amount relating to the noise, based on the weighting factor.

14. The image processing apparatus according to claim 2, wherein the dividing means includes:

feature value calculation means for calculating from the image signal a feature value relating to at least one of the color, the frequency, and the texture, and label assignment means for assigning a label to the image signal based on feature value.

15. The image processing apparatus according to claim 2, wherein the dividing means includes:

image display means capable of displaying the image signal and having a touch panel function, region setting means for dividing the regions based on an instruction sent from the image display means, and label assignment means for assigning a label to the image signal based on an instruction sent from the image display means.

16. The image processing apparatus according to claim 2, wherein the dividing means includes:

image display means capable of displaying the image signal in the form of a plurality of divided block regions, block selection means for selecting at least one block region of the plurality of block regions, and label assignment means for assigning a label to the image signal based on the selected block region.

17. The image processing apparatus according to claim 1, wherein the setting means includes:

first formulization means for formulizing a relationship between the information amount relating to the image signal and a tone conversion characteristic based on the information amount relating to the image signal and a predetermined prediction formula, second formulization means for formulizing a relationship between the information amount relating to the noise and the tone conversion characteristic based on the information amount relating to the noise and a predetermined prediction formula, search means for searching for a tone conversion characteristic maximizing an effective information amount based on a formula of the information amount relating to the image signal and a formula of the information amount relating to the noise, and output means for outputting a tone conversion curve corresponding to the tone conversion characteristic maximizing the effective information amount.

18. The image processing apparatus according to claim 17, wherein the setting means uses a multiplier coefficient with respect to a reference tone conversion curve as the tone conversion characteristic.

19. The image processing apparatus according to claim 17, wherein the setting means uses a distance with respect to a reference tone conversion curve as the tone conversion characteristic.

20. The image processing apparatus according to claim 17, wherein at least one of the first formulization means and the second formulization means uses a second order functional equation as the prediction formula.

21. The image processing apparatus according to claim 5, wherein the noise estimation means includes:
collection means for collecting information relating to a temperature value of the image pickup system and a gain value with respect to the image signal,
standard value assignment means for assigning a standard value relating to information unobtainable by the collection means,
average calculation means for calculating an average value of the image signals in a local region of a predetermined size including the pixel or the predetermined unit area, and
noise amount calculation means for calculating the noise amount based on the average value and the information transmitted from the collection means or the standard value assignment means.

22. The image processing apparatus according to claim 7, wherein the second noise estimation means includes:
collection means for collecting information relating to a temperature value of the image pickup system and a gain value with respect to the image signal,
standard value assignment means for assigning a standard value relating to information unobtainable by the collection means,
average calculation means for calculating an average value of the image signals in a local region of a predetermined size including the pixel or the predetermined unit area, and
noise amount calculation means for calculating the noise amount based on the average value and the information transmitted from the collection means or the standard value assignment means.

23. The image processing apparatus according to claim 3, wherein the noise reducing means includes:
noise range setting means for setting a noise range based on the estimated noise amount,
first smoothing means for performing smoothing on the image signal when the image signal falls within the noise range, and
second smoothing means for performing correction on the image signal when the image signal does not fall within the noise range.

24. The image processing apparatus according to claim 2, further comprising combining means for combining the image signals of the respective regions subjected to the tone conversion processing.

25. An image processing method for performing tone conversion processing on an image signal obtained from an image pickup system, the image processing method comprising:
an information amount calculation step of calculating entropies representing an information amount relating to the image signal and entropies representing an information amount relating to noise from the image signal,
a setting step of setting a tone conversion curve used in the tone conversion processing based on the information amount relating to the image signal and the information amount relating to the noise, and
a tone conversion step of performing the tone conversion processing on the image signal based on the tone conversion curve.

* * * * *